(12) United States Patent
Grassi et al.

(10) Patent No.: US 9,975,377 B2
(45) Date of Patent: May 22, 2018

(54) TYRE FOR VEHICLE WHEELS

(71) Applicant: PIRELLI TYRE S.P.A., Milan (IT)

(72) Inventors: Lisa Grassi, Milan (IT); Giuseppina Ratti, Milan (IT); Omar Ballabio, Milan (IT); Luigia Rossiello, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 248 days.

(21) Appl. No.: 14/651,976

(22) PCT Filed: Dec. 11, 2013

(86) PCT No.: PCT/IB2013/060819
§ 371 (c)(1),
(2) Date: Jun. 12, 2015

(87) PCT Pub. No.: WO2014/091429
PCT Pub. Date: Jun. 19, 2014

(65) Prior Publication Data
US 2015/0314644 A1 Nov. 5, 2015

Related U.S. Application Data

(60) Provisional application No. 61/826,150, filed on May 22, 2013.

(30) Foreign Application Priority Data

Dec. 14, 2012 (IT) .............................. MI2012A2135

(51) Int. Cl.
*B60C 1/00* (2006.01)
*B29D 30/08* (2006.01)
(Continued)

(52) U.S. Cl.
CPC ................ *B60C 1/00* (2013.01); *B29D 30/08* (2013.01); *B60C 1/0041* (2013.01); *B60C 5/00* (2013.01);
(Continued)

(58) Field of Classification Search
CPC .......... B60C 1/00; B60C 1/0041; B29D 30/08
See application file for complete search history.

(56) References Cited

U.S. PATENT DOCUMENTS 3,547,764 A 12/1970 Van Amerongen
3,751,331 A 8/1973 Dane et al.
(Continued)

FOREIGN PATENT DOCUMENTS

EP 1 221 456 A1 7/2002
EP 1 491 365 A2 12/2004
(Continued)

OTHER PUBLICATIONS

Gent, Alan. "Pneumatic Tire," Sep. 18, 2006, University of Akron. pp. 20-30, 85.*
(Continued)

*Primary Examiner* — Robert C Dye
(74) *Attorney, Agent, or Firm* — Finnegan, Henderson, Farabow, Garrett & Dunner, L.L.P.

(57) ABSTRACT

Tires for vehicle wheels having reduced environmental impact and the components thereof, in particular reinforcing structural elements such as carcass structures, belt structures, flippers and chafers, include elongated reinforcing elements treated with resorcinol and formaldehyde-free cross-linkable adhesive compositions. The adhesive compositions include at least a) a rubber latex, at least b) an epoxide and at least c) a polyamine with molecular weight higher than 190 Daltons, including at least two amino groups selected from primary —NH2 and secondary —NH—
(Continued)

amino groups. In the structural element, these compositions confer an adhesion between cords and compounds that is comparable to, if not better than, the traditional RFL system in use in this sector. Furthermore, by suitably modifying the compound compositions in the reinforced structural elements and, possibly, also in the other elastomeric components of the tire, it is possible to manufacture tires while avoiding the use of toxic chemicals, such, as resorcinol and formaldehyde.

33 Claims, 2 Drawing Sheets

(51) Int. Cl.
| | |
|---|---|
| *B60C 5/00* | (2006.01) |
| *B60C 9/02* | (2006.01) |
| *B60C 9/18* | (2006.01) |
| *B60C 15/06* | (2006.01) |
| *C09J 109/10* | (2006.01) |
| *C08K 5/1515* | (2006.01) |
| *C09J 105/00* | (2006.01) |
| *C08K 5/06* | (2006.01) |
| *C08K 5/17* | (2006.01) |
| *C08L 7/00* | (2006.01) |
| *C08L 9/00* | (2006.01) |
| *C08L 21/02* | (2006.01) |
| *B60C 9/00* | (2006.01) |
| *C08L 63/00* | (2006.01) |

(52) U.S. Cl.
CPC .............. *B60C 9/0042* (2013.01); *B60C 9/02* (2013.01); *B60C 9/18* (2013.01); *B60C 15/0603* (2013.01); *C08K 5/06* (2013.01); *C08K 5/1515* (2013.01); *C08K 5/17* (2013.01); *C08L 7/00* (2013.01); *C08L 9/00* (2013.01); *C08L 21/02* (2013.01); *C08L 63/00* (2013.01); *C09J 105/00* (2013.01); *C09J 109/10* (2013.01); *B60C 2001/005* (2013.01); *B60C 2001/0066* (2013.01); *B60C 2015/0614* (2013.01); *C09J 2405/003* (2013.01); *C09J 2409/003* (2013.01); *Y10T 152/1081* (2015.01); *Y10T 152/10828* (2015.01); *Y10T 152/10846* (2015.01)

(56) References Cited

U.S. PATENT DOCUMENTS

| | | | | |
|---|---|---|---|---|
| 4,155,394 | A | * | 5/1979 | Shepherd .............. B60C 9/0042 139/426 R |
| 4,472,463 | A | | 9/1984 | Solomon |
| 4,680,228 | A | * | 7/1987 | Sharma ...................... C08J 5/06 156/110.1 |
| 7,067,189 | B2 | | 6/2006 | Huynh-Tran et al. |
| 2002/0122938 | A1 | | 9/2002 | Fisher |
| 2004/0007304 | A1 | * | 1/2004 | Minami ................... B60C 5/12 152/551 |
| 2004/0249053 | A1 | | 12/2004 | Huynh-Tran et al. |
| 2004/0261928 | A1 | | 12/2004 | Imhoff et al. |
| 2006/0169382 | A1 | * | 8/2006 | Sandstrom ................ B60C 1/00 152/537 |
| 2007/0209751 | A1 | | 9/2007 | Imhoff et al. |
| 2009/0056849 | A1 | | 3/2009 | Imaoka et al. |
| 2010/0175805 | A1 | | 7/2010 | Wada |
| 2011/0104415 | A1 | | 5/2011 | Aalbers et al. |

FOREIGN PATENT DOCUMENTS

| | | |
|---|---|---|
| EP | 1 854 917 A1 | 11/2007 |
| EP | 2 426 253 A1 | 3/2012 |
| GB | 1 271 883 | 4/1972 |
| WO | WO 2005/080481 A1 | 9/2005 |

OTHER PUBLICATIONS

Written Opinion of the International Searching Authority issued by the European Patent Office in International Patent Application No. PCT/IB2013/060819, dated Feb. 28, 2014 (4 pages).
International Search Report issued by the International Patent Office in International Patent Application No. PCT/IB2013/060819, dated Feb. 28, 2014 (3 pages).

* cited by examiner

TYRE FOR VEHICLE WHEELS

CROSS REFERENCE TO RELATED APPLICATIONS

This application is a national phase application based on PCT/IB2013/060819, filed Dec. 11, 2013, which claims the priority of Italian Patent Application No. MI2012A002135, filed Dec. 14, 2012, and the benefit of U.S. Provisional Application No. 61/826,150, filed May 22, 2013, the content of each application being incorporated herein by reference.

TECHNICAL FIELD OF THE INVENTION

The object of the present invention is a more eco-compatible tyre for vehicle wheels, in particular the object is a tyre comprising at least one structural component having reduced environmental impact. The invention further relates to a manufacturing process of a tyre for vehicle wheels.

BACKGROUND OF THE INVENTION

In tyres for vehicle wheels, the reinforced structural elements, comprising reinforcing elements, in particular cords and elastomeric matrix that encompasses said reinforcing elements, perform different functions that can be structural, containment or protection functions.

One of the characteristics to be controlled to ensure the integrity of the reinforced structural elements is that the reinforcing elements or cords firmly adhere to the elastomeric material so as to prevent lacerations and breaking down of the compound.

Typically, materials suitable for the reinforcing cords of the layers of the carcass structures, belt structures, and/or bead protection layers (chafers) or reinforcement layers (flippers), can be textile or metal materials, depending on the positioning and/or on the types of tyres and/or of use.

The non-metal materials most commonly used as components of cords for tyres can be natural polymer fibres such as for example rayon and lyocell, or synthetic fibres such as for example aliphatic polyamides (nylon), polyesters and aromatic polyamides (generically known as aramids), selected on the basis of the component within which they are to be incorporated and of the type (for two- or four-wheel vehicles, for heavy-duty vehicles) and depending on the performance requirements such as for example HP (high performance), UHP (ultra high performance), competitions, road or off-road.

The polymeric fibres, typically those made of polyester, and the aramids, present high tensile elastic responses, with elongations that are respectively relatively low or very low, but, by their very nature, in particular the aramids, adhere with difficulty to the tyre.

Adhesive compositions—for example Resorcinol-Formaldehyde-Latex (RFL)—were therefore developed in the tyre sector. These compositions ensure and maintain excellent adhesion of the cords to the tyres, not only in the tyre manufacturing step but above all in the conditions of use thereof and, at the same time, allow materials with very different mechanical properties such as elastomers, which are very elastic, and the above-mentioned fibres, which are rather rigid, to be successfully coupled in a compound. These adhesive RFL-based compositions are applied onto textile cords, generally by dipping. The cords thus treated can be incorporated within an elastomeric matrix to then be assembled together with other semi-finished products in the assembly of a green tyre, which is then shaped and subjected to moulding and vulcanization.

Some fibres, such as rayon and aliphatic polyamides, already acquire optimal properties for coupling with the elastomeric material by means of a single dip in the RFL-based bath (one-step process) while others, such as polyesters or even more so aromatic polyamides, bind with difficulty to the tyres and therefore require special activating pre-treatments of a physical or chemical nature, such as for example the surface activation of the fibres with micro-fibrillations, treatment with ionizing rays, with plasma, with solvent or pre-treatment with a first activating bath (two-step process).

Thanks to the surface pre-activation of the fibres, this pre-treatment, by means of epoxides or isocyanates or other suitable activators, greatly improves the reactivity of the system through the formation of bonds between the pre-treated fibre and the RFL system. Surface pre-activation can take place in the spinning phase through the use of suitable activation baths or directly in the dipping step (double bath process).

Typically, to further strengthen the adhesion of the cords to the tyres, it is possible to introduce specific additives to the compounds that are to cover the cords, such as adhesion promoters, generally comprising a methylene donor, such as for example hexamethylenetetramine, and a methylene acceptor, such as for example resorcinol. During the vulcanization step the cross-linking of these additives allows superior adhesion to be achieved that is more or less elevated depending on the type of compound, promoter, fibre and the treatments thereof.

The RFL system seems to represent the most widespread and effective cord adhesive in use in the tyre sector and, to the knowledge of the Applicant, no alternative systems of actual industrial applicability that achieve such high performance appear to exist.

Albeit resolving, in a more than satisfactory manner, the adhesions problems between cords and tyres, RFL-based compositions are not however ideal for an industrial use on account of the more or less marked toxicity of its reactive components, resorcinol and formaldehyde, both for man and for the environment. In particular, since formaldehyde is a known carcinogenic while resorcinol is suspected to be harmful to the endocrine system, it would be desirable to significantly reduce—if not eliminate—the use thereof in each step of the manufacture of tyres.

Furthermore, t aqueous compositions of RFL are not particularly stable and require a predetermined "aging" period, known as maturation, to reach a sufficient stability for the end use in the present applications.

The high solids content in the RFL emulsions causes, during industrial use, a progressive fouling and build-up of deposits in the various parts of the treatment line; if not appropriately eliminated, these deposits can represent a pollution and fouling risk for woven fabrics treated with RFL.

The regulatory authorities responsible for the classification of chemical compounds in terms of safety are analyzing aspects of health and environment of the components commonly used in the field to date, directing research and the market towards more eco-compatible tyres.

Notwithstanding the above problems, we have been as yet unable to replace the RFL system with other systems having equal performance.

In this regard, some alternative substantially resorcinol- and formaldehyde-free adhesive compositions, which were however potentially toxic and/or showed decidedly inferior adhesive performance than the performance of the RFL treatment and/or were endowed with a low stability and therefore were not suitable for industrial use, were studied and described in the past.

For example, the documents WO2005/080481, US2011104415 (Diolen Industrial Fibres) and EP2426253 (Bridgestone Corp.) describe substantially resorcinol- and formaldehyde-free compositions for adhering reinforcing polyester, polyphenylen-disulfide or thermotropic liquid crystalline polymers elements to tyres, wherein the compositions comprise at least a) a rubber latex, at least b) an epoxide and c) a polyfunctionalized amino cross-linking agent, in aqueous dispersion. A number of possible amino cross-linking agents that are theoretically suitable for the purpose are listed in the description, however experimental data have been provided for just one compound, piperazine.

The Applicant has found that albeit the compositions comprising certain aliphatic polyamines generally suggested in WO2005/080481 or US2011104415 cross-link well, they are too unstable for an effective industrial use. Moreover, many amines, in particular piperazine, are in any case potentially toxic.

GB1,271,883 shows aqueous composition useful for improving the adherence of polyester fibers to the tyres comprising polyamines, in particular polyalkylenamine or polyethylenimine, poly-epoxides and elastomeric polymers.

U.S. Pat. No. 4,472,463 (Goodrich Company) describes an aqueous adhesive emulsion of latex and acrylic resin that is substantially resorcinol-and formaldehyde-free and is used as a second bath for the coating of polyester and aramid fibres to be incorporated in rubber products.

One drawback of this system is that in order to confer an acceptable adhesion to the fibres, they must always be pre-treated with an epoxy composition (double bath), with greater processing times and costs than single dip processes. In addition, the system, which does not also comprise a cross-linking agent, could result in the formation of bonds that are less tenacious with the rubber.

U.S. Pat. No. 7,067,189 (Performance Fibres, Honeywell) shows aqueous adhesive compositions, useful for adhering polymeric fibres to rubber, comprising a modified water-soluble maleinized polybutadiene and, possibly, a latex which, albeit less toxic due to the absence of resorcinol and formaldehyde, do not succeed in matching the performance of the RFL system, not even following optimization of the compounds and/or of the pre-treatment of the fibres.

SUMMARY OF THE INVENTION

In the tyre field, there is a particular need to avoid or at least reduce the use of toxic components in all the manufacturing steps thereof.

The Applicant has felt the need to provide more eco-compatible tyres and components thereof, in particular tyres that do not use resorcinol and formaldehyde in the adhesive compositions for cords in use and possibly also in compounds, tyres characterized by structural integrity and adhesion between the elastomeric component and the reinforcing elements incorporated therein at least comparable if not improved with respect to the already very high structural integrity and adhesion provided by the RFL system currently in use.

In this context, the Applicant dealt with the problem of availing itself of alternative adhesive compositions the effectiveness of which were independent of the time elapsing between the preparation and end use thereof, that were also sufficiently stable to allow the storage and transport thereof under as standard conditions as possible without having to resort, for example, to refrigeration, inertisation with particular gases or dark storage, and which, when used, would not release solid residues into the plants.

The Applicant has noted that the function of the reinforced structural elements does not seem to be limited to the type of reinforcing element incorporated in the polymeric layer but would imply an optimal cooperation between the reinforcing elements (typically the cords) and the elastomeric portion.

The Applicant has found that it is possible to produce more eco-compatible tyres, in particular, tyres substantially free of resorcinol and formaldehyde, and to reduce the environmental impact in the production thereof and of the components thereof, while at the same time maintaining the optimal structural integrity of the tyre conferred until now by the traditional RFL system.

The Applicant has found that it is possible to impart a high adhesion between the elastomeric components and the reinforcing elements of said tyres and components, while granting the structure suitable integrity and resistance suitable for a safe use of the tyre even under severe conditions and/or for extended mileage.

This result was achieved thanks to the use of reinforcing elements comprising textile reinforcing materials suitably pre-treated with adhesive, eco-compatible compositions that are substantially resorcinol- and formaldehyde-free.

These compositions, as well as being more eco-compatible than those commonly in use, are very stable and easy to handle and are therefore of advantageous industrial applicability.

These compositions having a significantly lower solids content compared to the RFL compositions release much less residue into the plants, with undoubted advantages in terms of the efficiency and cleanliness thereof.

According to a first aspect, the present invention relates to a tyre for vehicle wheels comprising:

at least one reinforced structural element comprising at least one cross-linked elastomeric material and at least one elongated reinforcing element, characterized in that said elongated reinforcing element comprises the cross-linking products of at least one cross-linkable adhesive composition comprising at least a) a rubber latex, at least b) an epoxide and at least c) a polyamine of molecular weight greater than 190 Dalton, comprising at least two amino groups selected from primary —$NH_2$ and secondary —NH—amino groups.

The present invention may present one or more of the following preferred features in one or more of its aspects.

Preferably, said tyre is substantially free of cross-linking products of resorcinol.

According to a preferred embodiment, the tyre comprises:
a carcass structure comprising at least one carcass layer having opposite side edges associated with respective bead structures comprising at least one annular anchoring element and at least one bead filler;
a tread applied in a radially outer position to said carcass structure;
wherein said at least one carcass layer comprises a cross-linked elastomeric material that is reinforced with a plurality of elongated reinforcing elements comprising the cross-linking products of at least one cross-linkable adhesive composition comprising at least a) a rubber latex, at least b) an epoxide, and at least c) a polyamine with molecular weight higher than 190 Dalton, comprising at least two amino groups selected from primary —NH—$_2$ and secondary —NH— amino groups.

The tyre preferably comprises a belt structure applied in a radially outer position to the carcass structure, said belt structure comprising at least one belt layer comprising said elongated reinforcing element comprising the cross-linking products of at least one cross-linkable adhesive composition comprising at least a) a rubber latex, at least b) an epoxide, and at least c) a polyamine with molecular weight higher than 190 Dalton, comprising at least two amino groups selected from primary —$NH_2$ and secondary —NH— amino groups.

In a preferred embodiment the tyre for vehicle wheels comprises a reinforced structural element of the bead structures, wrapped around the respective annular anchoring element and the filling of the bead so as to at least partially surround them, said reinforced structural element of the bead structures, or flipper, comprising at least one cross-linked elastomeric material and at least one elongated reinforcing element, wherein said elongated reinforcing element comprises cross-linking products of at least one cross-linkable adhesive composition comprising at least a) a rubber latex, at least b) an epoxide and at least c) a polyamine of molecular weight greater than 190 Dalton, comprising at least two amino groups selected from primary —$NH_2$ and secondary —NH— amino groups.

In a preferred embodiment, the tyre comprises a reinforced structural element in the form of a protective layer of the bead structure, said protective layer, or chafer, comprising at least one cross-linked elastomeric material and at least one elongated reinforcing element, wherein said elongated reinforcing element comprises the cross-linking products of at least one cross-linkable adhesive composition comprising at least a) a rubber latex, at least b) an epoxide and at least c) a polyamine of molecular weight greater than 190 Dalton, comprising at least two amino groups selected from primary —$NH_2$ and secondary —NH— amino groups.

In a second aspect, the present invention relates to a process for producing a tyre for vehicle wheels, comprising:
  forming components of a green tyre onto at least one building drum;
  shaping, moulding and vulcanizing the tyre;
wherein to form at least one of the components of the green tyre comprises:
  making at least one reinforced structural element, said reinforced structural element comprising i) at least one elastomeric material comprising at least one diene elastomeric polymer and at least one reinforcing filler and ii) at least one elongated reinforcing element, wherein said elongated reinforcing element comprises at least one fibrous material preventively impregnated with at least a cross-linkable adhesive composition comprising at least a) a rubber latex, at least b) an epoxide, and at least c) a polyamine with molecular weight higher than 190 Dalton, comprising at least two amino groups selected from primary —$NH_2$ and secondary —NH— amino groups.

Preferably, making said at least one reinforced structural element comprises at least:
  providing at least one cross-linkable elongated reinforcing element preventively impregnated with at least a cross-linkable adhesive composition comprising at least a) a rubber latex, at least b) an epoxide, and at least c) a polyamine with molecular weight higher than 190 Dalton, comprising at least two amino groups selected from primary —$NH_2$ and secondary —NH— amino groups,
  providing at least one elastomeric material suitable for adhering, following cross-linking, to the elongated reinforcing element, said elastomeric material comprising at least one cross-linkable elastomeric polymer, at least one reinforcing filler, at least one methylene donor compound, at least one methylene acceptor compound and at least one vulcanizing agent,
  placing said at least one elongated reinforcing element in contact with said at least one cross-linkable elastomeric material,
  making said at least one elongated reinforcing element adhere to said at least one cross-linkable elastomeric material by heating and, preferably, by compression.

Preferably, adhesive compositions and/or elastomeric materials comprising resorcinol and/or free formaldehyde are used in none of the steps of said processes.

In another aspect, the invention relates to a reinforced structural element of a tyre comprising at least one elongated reinforcing element and at least one cross-linked elastomeric material adhered to said elongated reinforcing element, characterized in that said elongated reinforcing element comprises at least one elongated fibrous material comprising the cross-linking products of at least one cross-linkable adhesive composition comprising at least a) a rubber latex, at least b) an epoxide, and at least c) a polyamine with molecular weight higher than 190 Dalton, comprising at least two amino groups selected from primary —$NH_2$ and secondary —NH— amino groups.

Preferably, said reinforced structural element comprises a cross-linked elastomeric material suitable for adhering to the elongated reinforcing element, said cross-linked elastomeric material being obtained by cross-linking a cross-linkable elastomeric material comprising at least one cross-linkable elastomeric polymer, at least one reinforcing filler, at least a methylene donor compound, at least one methylene acceptor compound and at least one vulcanizing agent, wherein said methylene acceptor compound is a phenolic resin, preferably a novolac.

Preferably, said methylene acceptor compound does not comprise resorcinol.

Preferably, said reinforced structural element is substantially resorcinol-free.

Preferably, said cross-linkable elastomeric material is substantially resorcinol free.

Cross-linkable elastomeric material that is "substantially resorcinol free" means that the resorcinol content in the non-cross-linked compound is less than 0.5 phr, preferably less than 0.2 phr, more preferably less than 0.1 phr.

Elastomeric material, composition, reinforcement element, structural element and the like, that are "(substantially) resorcinol- and/or formaldehyde-free" indicates that these components are preferably prepared by substantially or, preferably, fully avoiding the use of resorcinol and free formaldehyde in all the manufacturing steps thereof.

Preferably, said at least one reinforced structural element can be a carcass structure, a belt, a flipper or a chafer.

Preferably, said reinforced structural element of a tyre presents an adhesion between the cross-linked elastomeric material and the elongated reinforcing element, expressed as the maximum pulling force according to ASTM D4776, normalized with respect to the area of the interface between cords and elastomeric material in the specimen prepared according to this rule, of at least 7 $N/mm^2$.

More preferably, said adhesion is at least 7.5 $N/mm^2$, even more preferably of at least 8 $N/mm^2$ or 8.5 $N/mm^2$.

It is reported by way of example the calculation of the adhesion to a cord Ar 1670/2 31.5 x31.5, having a diameter of 0.68 mm (second measurement in optical microscopy)

embedded length equal to 9.52 mm. The interface area in the adhesion specimen prepared according to ASTM D4776 will be equal to:

Area=π*0.68 mm*9.52 mm=20.34 mm²

For a maximum pull out force of 165 N, normalized adhesion will be equal to:

165N/20.34 mm²=8.1 N/mm².

The term embedded length means the length of the cord in the specimen that is completely surrounded by rubber.

It should be borne in mind that in standard ASTM D4776, cords with total titre in excess of 2200 dTex use specimens having an embedded length equal to 9.52 mm; for cords with total titre equal to or less than 2200 dTex specimens with embedded length equal to 6.40 mm are used instead.

Preferably, said reinforced structural element of a tyre has a degree of coating of the cords following the peel test performed in accordance with standard ASTM D4393 of at least 50%, evaluated by visual observation of the sample.

Preferably, said coating value is at least 75%, more preferably at least 90%.

Preferably, said cross-linkable elongated reinforcing element for tyres comprises at least one fibrous material preventively impregnated with at least a cross-linkable adhesive composition, said composition comprising at least a) a rubber latex, at least b) an epoxide, and at least c) a polyamine with molecular weight higher than 190 Dalton, comprising at least two amino groups selected from primary —NH$_2$ and secondary —NH— amino groups.

Preferably, said elongated reinforcing cross-linkable element is substantially free of resorcinol and/or of the cross-linking products thereof.

Preferably, said elongated reinforcing cross-linkable element is substantially free of free formaldehyde.

Preferably, said cross-linkable adhesive composition is substantially resorcinol free.

In another aspect, the invention relates to a process for manufacturing an elongated reinforcing cross-linkable element for a tyre, which comprises:
- providing an elongated fibrous material for reinforced structural elements for tyres
- impregnating the elongated fibrous material with at least one cross-linkable adhesive composition comprising at least a) a rubber latex, at least b) an epoxide, and at least c) a polyamine with molecular weight higher than 190 Dalton, comprising at least two amino groups selected from primary —NH$_2$ and secondary —NH— amino groups,
- drying the preventively impregnated elongated fibrous material.

Preferably, the fibrous material impregnated with the cross-linkable adhesive composition is subjected, during or following the drying step, to a partial or complete cross-linking of the composition itself, preferably by heating, for example at about 200-250° C. generally for a timeframe of 1 to 3 minutes.

Preferably, the fibrous material is selected from tape, flat yarn, cord, compact cross-section monofilament and woven fabric.

Preferably, the elongated fibrous material comprises one or more materials selected from rayon, lyocell, polyesters, aliphatic polyamides (nylon) and aromatic polyamides (aramids), more preferably comprises polyesters and polyamides, even more preferably aromatic polyamides.

Preferably, providing the elongated fibrous material comprises twisting at least one yarn.

Preferably, providing the fibrous material comprises combining at least two yarns by doubling, twisting.

Preferably, said impregnating step of the elongated fibrous material is carried out by dipping in the cross-linkable adhesive composition, more preferably by single dipping.

Advantageously, by suitably modifying the composition of the compounds, it has been possible to match and sometimes exceed the already remarkable adhesion performance of the traditional RFL system.

Therefore when the tyres of the invention comprise—at the level of reinforced components—both the optimized compounds and the cords treated with the adhesive compositions of the invention, they present the integrity and the excellent performance of the tyres based on the RFL system but, advantageously, have a lower content or are substantially free of the cross-linking products of resorcinol.

Advantageously, the tyres of the invention are produced without the use of resorcinol and formaldehyde.

Even more advantageously, by also using cross-linkable compounds that are substantially resorcinol- and formaldehyde-free for the non-reinforced components, more eco-sustainable tyres can be produced, tyres, the manufacturing process of which are less harmful to the health of the workers and to the environment.

Advantageously avoiding or significantly reducing the use of resorcinol and formaldehyde in each manufacturing step of the tyre, makes the present process and the products thus manufactured more eco-compatible and more respectful to human health and to the environment.

Preferably, these results, already in themselves very satisfactory considering the high level of performance provided by the standard RFL system, can be obtained with a single treatment of the fibrous material of the reinforcing elements and also in the case of the most difficult to adhere materials, such as polyesters or aramids, thereby reducing manufacturing timeframes and costs compared to the traditional two-step processes that require an additional pre-activation step.

DETAILED DESCRIPTION OF THE INVENTION

The term "reinforced structural element for tyres" means a composite structural element comprising at least one fibrous material and at least one elastomeric material.

Fibrous material means a material comprising fibres in the form of, for example, raw fibres, yarns, woven fabrics, non-woven fabrics, twisted yarns, threads, cords, preferably cords.

The cords may have the form of woven fabric (or consist of a weft and a warp) or form of a yarn or single ply.

The cords can consist of a single type of fibre or, in hybrid cords, comprise at least two fibres having a different chemical nature, mixed at the level of twisting as traditional hybrid or at the level of the yarn, by doubling, commingling or equivalent technologies.

The titre or linear density of yarns or plies can be expressed in decitex (dTex), i.e. mass expressed in grams of a thread or thread-like reinforcing element having a length of 10000 m.

For example 1680/2 (31.5×31.5) identifies a cord formed by two yarns or plies, each yarn or ply having a titre of 1680 dTex (total titre of the cord equal to 3360 dTex).

"Total titre" of a cord means the sum of the titres of the yarns or plies twisted together to form the cord.

Each yarn or ply is twisted around itself with 31.5 twists per decimetre corresponding to 315 twists per meter (TPM). The two yarns or plies are twisted together (preferably in opposite direction) with 315 twists per decimetre to form a cord.

In the present invention, fibrous twisted materials are preferably used, even if application of the invention to non-twisted yarns or tapes is not excluded in principle.

Preferably, each yarn or ply has a titre greater than or equal to about 500 dTex Preferably, each yarn or ply presents a titre of less than or equal to about 4000 dTex Preferably, each yarn or ply presents a titre of between about 700 and about 3680 dTex, more preferably between about 1000 and about 2400 dTex.

The twists made to the single doubled or coupled yarns can be in the same direction or in the opposite direction to those made to the single yarns.

Preferably, the cords comprise yarns or plies having different titres to form a yarn which is then twisted alone or together with other yarns.

Preferably, the cords comprise yarns or plies having titres equal to one another.

Examples of titres of each yarn usable as a fibrous material for producing the reinforcing elements in the form of cords are:

for polyesters (for example PET and PEN) 550 dTex, 830 dTex, 1100 dTex, 1440 dTex, 1670 dTex, 2200 dTex, 2880 dTex and 3340 dTex for aliphatic polyamides (such as Nylon NY66, or NY6 NY46) 700 dTex, 940 dTex, 1400 dTex, 1880 dTex, 2100 dTex, 2880 dTex;

for aramids 550 dTex, 800 dTex, 840 dTex 1100 dTex, 1670 dTex, 3340 dTex for Rayon and Lyocell 1220 dTex, 1840 dTex, 1540 dTex, 2440 dTex, 3680 dTex The reinforcing elements can be obtained from at least one yarn, more preferably by at least two yarns or plies combined.

Preferably, said reinforcement elements consist of a number of combined yarns not exceeding four.

Preferably, said cords present a total titre in excess of about 800 dTex.

Preferably, said cords present a total titre in excess of about 1300 dTex.

Preferably, said cords present a total titre of less than about 10,000 dTex.

Preferably, said cords present a total titre less than about 8000 dTex.

The fibrous material, preferably in cords, can consist of fibres of natural or synthetic origin commonly used in the sector, such as Rayon, Lyocell, aliphatic polyamides (for example Nylon, for example NY6, NY66, NY46), polyesters (for example PEN, PET, PVA), aromatic polyamides (for example aramids such as Twaron®, Kevlar® which are lyotropic liquid crystals), individually or in mixture. The fibrous material is preferably selected from aromatic polyesters and polyamides.

Preferably, the preventively impregnated fibrous material is then coupled to the elastomeric material by heating and, preferably by compression according to rubberizing processes typically adopted in tyre technology for example by extrusion or calendering or according to suitable alternative techniques such as solvent casting or spray coating.

Preferably, the fibrous material preventively impregnated with said cross-linkable adhesive composition can be directly arranged on the tyre precursor during the assembly of the latter without being first rubberized. The impregnated fibrous material can be subjected to a first cross-linking, generally by heating, before being coupled with the compound to be cross-linked and vulcanized.

According to the present invention the fibrous material is impregnated with at least one cross-linkable adhesive composition comprising at least a) a rubber latex, at least b) an epoxide, and at least c) a polyamine with molecular weight higher than 190 Dalton, comprising at least two amino groups selected from primary —$NH_2$ and secondary —NH— amino groups, The term impregnated means, preferably, the dipping of the fibrous material into the cross-linkable adhesive composition followed, preferably, by drying and cross-linking of the adhesive itself.

Following treatment, the components of the present cross-linkable adhesive composition will thus deposit on the surface and, partially, within the fibrous material providing the impregnated fibrous material.

Alternatively, the fibrous material can be impregnated with the present cross-linkable adhesive composition through other processes known to persons skilled in the art, such as spraying, brushing, etc.

In a preferred embodiment, the fibrous material is impregnated once with the present cross-linkable adhesive composition, preferably by dipping (single bath), without being preliminarily subjected to physical and/or chemical activations of the fibres. Understandably this single-step process, giving the fibrous material an adhesiveness to the elastomeric material that is comparable if not superior to that granted with the classic two-step RFL treatment, is particularly advantageous in terms of cost, time and environmental impact.

Alternatively, where required by the specific application or performance, the fibrous material can be pre-activated for treatment with a composition, equal to or different from the present cross-linkable adhesive composition (double bath) and/or physical activation (micro-fibrillations, treatments with ionizing rays, plasma, etc.).

Preferably, in the event in which the fibrous material is treated with two compositions different to each other, the use of a traditional composition comprising an epoxide as well as the present adhesive composition is preferred.

Preferably, the fibrous material will be treated first with the traditional epoxy composition and then with the present adhesive composition.

Preferably, both treatments will be carried out by dipping.

Preferably, the composition is an aqueous composition, for example a solution or aqueous dispersion, comprising between 2.5% and 20% by weight, preferably between 4% and 15% by weight, more preferably between 5% and 10% by weight of the total solids comprising the components a) b) and c).

Preferably, the percentages by weight of the individual components a), b) and c) vary between 2% and 17% of a), between 0.5 and 7% of b) and between 0.05% and 3% of c), more preferably between 3% and 12% of a), between 1% and 5% of b) and between 0.1% and 2% of c). The percentages of the individual ingredients are calculated with respect to the dry components.

The cross-linkable adhesive composition comprises at least a) a rubber latex, at least b) an epoxide, and at least c) a polyamine with molecular weight higher than 190 Dalton, comprising at least two amino groups selected from primary —$NH_2$ and secondary —NH— amino groups.

The rubber latex a) is generally selected primarily in consideration of its compatibility with the elastomeric material to which the fibrous material is to be adhered and its water solubility or dispersibility, it nevertheless not being limited to any specific type of latex It can generally be selected from diene polymer latexes commonly employed in the sector.

Examples of suitable latexes are those based on styrene copolymer-butadiene SBR/vinylpyridine (VP), based on natural rubber (NR), based on styrene-butadiene rubber (SBR), ethylene propylene diene monomer (EPDM), butadiene acrylonitrile (NBR), chlorosulphonated polyethylene (CSM), hydrogenated acrylonitrile butadiene (HNBR), chloroprene (CR), ethylene vinyl acetate (EVA), mixtures or copolymers thereof.

In the present invention there is a preference for the use of a copolymer based on butadiene, vinyl pyridine and styrene, for example Pliocord VP106S marketed by Eliokem, as the rubber latex In the present cross-linkable adhesive composition the rubber latex a) is generally present in an amount of between 2% and 17% by weight, preferably between 3% and 12% by weight.

In the present cross-linkable adhesive composition, the epoxide b) generally comprises one or more compounds having 2 or more epoxy groups per molecule of traditional use in the tyre sector.

The epoxide b) is preferably water-soluble or water-dispersible.

Examples of suitable epoxides are triglycidyl isocyanurate; 1-epoxyethyl-3,4-epoxycyclohexane; vinyl cyclohexene dioxide; ethylene glycol ether diglycidyl; 1,2-propanediol diglycidyl ether; 1,3-propanediol diglycidyl ether; 2,3-butanediol diglycidyl ether, and the glycidyl ethers of glycerol, erythritol, pentaerythritol and sorbitol that contain two or three glycide groups per molecule, for example diglycidyl ether of glycerol, triglycidyl ether of hexanotriol etc.

Other possible epoxides that can be used are 3,4-epoxycyclohexylmethyl-3,4-epoxycyclohexane carboxylate; 3-(3, 4-epoxycyclohexane)-8.9-epoxy-2,4-dioxaspiro[5.5]-undecane; bis(2,3-epoxycyclopentylether; bis(3,4-epoxy-6-methylcyclohexyl methyladipate; polyethylene glycol 400 diglycidyl ether; polyallyl glycidyl ether; bisphenol A diglycidyl ether and the like.

Other examples comprise water-soluble polyglycidyl ethers such as those of hydrocarbons between 2 and 10 aliphatic saturated polyhydroxylated carbon atoms. Other mixtures of two or more epoxides may also be used.

Preferred epoxides are, for example, the polyglycerol polyglycidyl ethers marketed by Raschig under the name of GE500 or GE100.

Typical compounds containing suitable epoxides comprise (3-glycidoxypropyl)trimethoxysilane, glyceryl epoxide, sorbitol epoxide, novolac epoxy resins, epoxidized oils, epoxidized polybutadiene or epoxidised polyisoprenes, wherein epoxy comprises compounds comprising glycidyl and non-glycidyl ether groups such as cycloaliphatic or acyclyc epoxides.

In the present cross-linkable adhesive composition the epoxide b) is generally present in an amount of between 0.5% and 7% by weight, preferably between 1% and 5% by weight.

The present cross-linkable adhesive composition comprises at least a) a rubber latex, at least b) an epoxide and at least c) a polyamine of molecular weight greater than 190 Dalton, comprising at least two amino groups selected from primary —NH$_2$ and secondary —NH— amino groups.

In the present cross-linkable adhesive composition the polyamine c) can be selected from:
c1) linear or branched amino-terminated polyethers, and/or
c2) aminoalkylated polysaccharides, and/or
c3) aminoalkylated polyvinyl alcohols and their mixtures.

The polyamine c) is water-soluble or water dispersible, in other words capable of dissolving or dispersing in water then maintaining the ability to react with a second reactive component.

If necessary, the water solubility or dispersibility of the polyamine can be changed with the aid of surfactants, dispersants, emulsifiers, etc. as known to persons skilled in the art. The polyamine c) has molecular weight greater than 190 Daltons, preferably greater than 210 Daltons, preferably greater than 220 Daltons, preferably greater than 230 Daltons, preferably greater than 300 Daltons, preferably greater than 400 Daltons, for example 430 or 440 Daltons, preferably equal to or greater than 600 Daltons.

In the case of polymer c) polyamines having a high molecular weight, molecular weight means the average molecular weight.

The polyamine c) can be a diamine, a triamine, or a polyamine and combinations thereof.

Preferably, in the molecular structure of the polyamine, the aforesaid amino groups are bonded in terminal position with respect to the polyether skeleton.

The polyamine c) can be linear or branched.

The polyamine c) can be selected from among the amino terminated, linear or branched polyethers c1).

The linear or branched amino-terminated polyethers c1) of the invention are characterized by a polyether skeleton comprising the repeating unit [O—R] where R is a hydrocarbyl group having between 2 and 5 carbon atoms.

The branched amino-terminated polyethers c1) comprise (but are not limited to) dendritic, star, comb structures where at least 2 of the branches terminate with primary and/or secondary amino groups. Tertiary amino groups may also be present.

The amino-terminated polyethers c1) of the invention have an average molecular weight greater than 190 Daltons, preferably greater than 210 Daltons, preferably greater than 220 Daltons, preferably greater than 230 Daltons, preferably greater than 300 Daltons, preferably greater than 400 Daltons, for example 430 or 440 Daltons, preferably equal to or greater than 600 Daltons.

The amino-terminated polyethers c1) of the invention preferably have an average molecular weight less than 10000 Daltons, preferably less than 5000 Daltons, Examples of water-dispersible amino-terminated polyethers are (but not limited to) linear, dendtitic and/or comb amino-terminated polyethylene oxide, linear, star-shaped, dendritic and/or comb amino-terminated polypropylene oxide, copolymers of ethylene oxide and linear, star, comb-shaped dendritic amino-terminated propylene oxide, linear, star, dendritic-shaped and/or comb amino-terminated polytrimethylene oxide, linear, star, dendritic-shaped and/or comb amino-terminated polybutylene-oxide, linear, star, dendritic-shaped and/or comb amino-terminated polytetrahydrofurans, linear star and comb-shaped amino-terminated copolymers of ethylene oxide and dendritictrimethylene oxide; linear comb, star and dendritic shaped amino-terminated copolymers of ethylene oxide and butylene oxide; linear and comb, star and dendritic shaped amino terminated copolymers of ethylene oxide and tetrahydrofuran.

The polyether skeleton of the polyamine c1) is derived from the polymerization of ethylene oxide (EO), propylene oxide (PO), butylene oxide (BO), pentylene oxide (PentO)

or mixtures thereof. In the composite structures the epoxide ratios can vary, for example, in a mixed EO/PO structure, the EO:PO ratio can vary between about 1:1 and about 1:50 and vice versa.

The polyamine c) can be selected from among the amino-alkylated polysaccharides c2).

The latter are polysaccharides that have at least two of the hydrogens of the hydroxy groups substituted with hydrocarbyl groups with at least one amino group (primary or secondary) and which are soluble in water or dispersible in water to form a suspension capable of reacting with a second reagent in an aqueous environment.

The hydrocarbyl group can be linear, branched or cyclic, aliphatic or aromatic. The hydrocarbyl group may be substituted or may contain heteroatoms, such as oxygen, sulphur, silicon or nitrogen.

Preferably, the amino-terminated polysaccharides c2) have an average molecular weight greater than 210 Daltons, preferably greater than 220 Daltons, preferably greater than 230 Daltons, preferably greater than 300 Daltons, preferably greater than 400 Daltons, for example 430 or 440 Daltons, preferably equal to or greater than 600 Daltons.

Preferably, the amino-terminated polysaccharides c2) have an average molecular weight of less than 1,000,000, more preferably less than 500,000 Dalton.

Examples of water-dispersible amino-terminated polysaccharides comprise (but are not limited to) amino-alkylated starches, amino-alkylated cellulose, amino-alkylated inulin, amino-alkylated dextran and corresponding hydroxyethyl aminoalkyl derivatives and mixtures thereof, where the alkyl-amino groups contain between 2 and 20 carbon atoms, possibly substituted or contain heteroatoms and contain at least one primary or secondary amino group. Examples of aminoalkyl groups comprise (but are not limited to) 2-aminoethyl and 3-aminopropyl.

The polyamine c) can be selected from among the amino-alkylated polyvinyl alcohols c3). The latter are polyvinyl alcohols that have at least two of the hydrogens of the hydroxy groups substituted with hydrocarbyl groups with at least one amino group (primary or secondary) and which are soluble or dispersible in water to form a suspension capable of reacting with a second reagent in an aqueous environment.

The hydrocarbyl group can be substituted or can contain heteroatoms, such as oxygen, sulphur, silicon, or nitrogen.

Preferably, the degree of hydrolysis of the polyvinyl alcohol is between 60% and 100% preferably between 80% and 100% more preferably between 95% and 99%.

Preferably, the water dispersible amino-alkylated polyvinyl alcohols c3) have an average molecular weight greater than 210 Daltons, preferably greater than 220 Daltons, preferably greater than 230 Daltons, preferably greater than 300 Daltons, preferably greater than 400 Daltons, for example 430 or 440 Daltons, preferably equal to or greater than 600 Daltons.

Preferably, they have molecular weight of between 2000 and 1,000,000 Daltons.

Examples of water dispersible amino-alkylated polyvinylalcohol c3) comprise (but are not limited to) amino-alkylated polyvinyl alcohols, amino-alkylated polyvinyl alcohol copolymers, amino-alkylated polyvinylalcohols derivatized with Ω-amino acetal groups, copolymers, amino-akylated polyvinylalcohols derivatized with Ω-amino acetal groups, polyvinyl alcohols amino-alkyl hydroxyethyl derivatives and mixtures thereof where the amino alkyl group and the Ω-amino acetal contain between 2 and 20 carbon atoms, are possibly substituted, possibly contain heteroatoms and contain at least two amino groups (primary and/or secondary).

Examples of aminoalkyl groups include but are not limited to 2-aminoethyl and 3-aminopropyl.

One example of a Ω-amino acetal group is the 4-aminobutyric acetal. The amino-alkylated copolymers and the polyvinyl alcohols derivatized with the Ω-amino acetal group comprise an amount of comonomer of between 1 and 100 mol percentage of the quantity of vinyl alcohol monomer units.

Possible comonomers include (but are not limited to) vinyl acetate, methyl vinyl ether, N-vinyl-formamide, ethylene, propylene, 1-butene, methyl acrylate, acrylic acid, methyl methacrylate, methacrylic acid, maleic acid, fumaric acid, itaconic acid and mixtures thereof.

Preferably, the polyamine c) is at least a linear or branched amino terminated polyether c1).

Preferably, the polyamine c) is selected from one or more polyamines of formula I, II, III and IV as defined below.

In a preferred embodiment, the polyamine c) comprises just two primary amino groups.

Preferably, the polyamine c) comprising just two primary amino groups is selected from the class of polyether amines of formula I

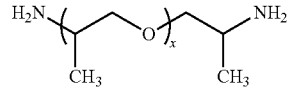

wherein X is greater than 1.5, preferably greater than 2.

Examples of commercial products representative of the structure are JEFFAMINE marketed by HUNTSMAN with the codes D-230, D-400, D-2000 and 0-4000, wherein X is respectively 2.5, 6.1, 33 and 68, preferably about 2.5 (Jeffammina D-230).

Preferably, the polyamine c) comprising just two primary amino groups is selected from the class of polyether amines of formula II

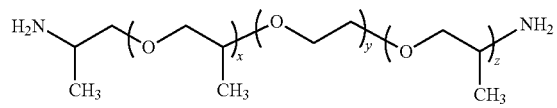

wherein X, Y and Z can assume values such that the average molecular weight of the compound of formula II is greater than 190 Daltons.

For example Y and X+Z can respectively assume the following values: 2.0/1.2 9.0/3.6 12.5/6.0 39/6.0 as in the Jeffamine ED-series marketed by Huntsman with the codes HK-511, ED-600 (XTJ-500), ED-900 (XTJ-501), ED-2003 (XTJ-502).

Preferably, the polyamine c) comprising just two primary amino groups is selected from the class of polyether amines of formula III

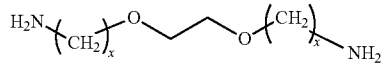

wherein X can assume values such that the average molecular weight of the compound of formula III is greater than 190 Daltons.

For example X can be 2 or 3, as in the Jeffamine EDR series marketed by Huntsman with the codes EDR-148 (XTJ-504) and EDR-176 (XTJ-590).

In one embodiment the polyamine c) comprises at least three primary amino groups.

Preferably, the polyamine c) comprising at least three primary amino groups, is selected in the class of polyether amines of formula IV

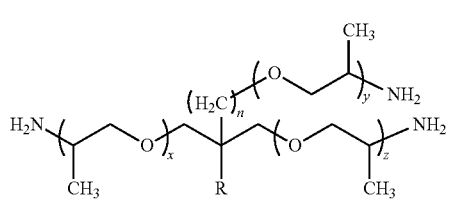

IV wherein R represents H or ethyl and X, Y and Z may assume values such that the average molecular weight of the compound of formula IV is found to be greater than 190 Daltons.

In the polyether amines of formula IV for example n can vary between 0 and 1, while X+Y+Z can be 5-6, 50 or 85, as in the Jeffamine T series marketed by Huntsman with the codes T-403, T3000 (XTJ-509) or T-5000.

In one embodiment the polyamine c) comprises three or more primary amino groups.

Examples of polyamines c) comprising three or more primary amino groups are branched polyether amines comprising amino polyethylene glycols, in particular star-shaped, having 3, 4 or 8 branches terminated with primary amines, such as for example octamine (8PEGA), supplied by Nektar Transforming Therapeutics (Huntsville, Ala.) Examples of branched polyamines are those defined US2011027215 under paragraphs 119 to 121.

In one embodiment, at least one amino group of the polyamine c) is secondary.

In one embodiment, the polyamine c) comprises at least two secondary amino groups.

Polyamines c) comprising at least two secondary amino groups are for example those marketed by Huntsman under the trade name of Jeffamine SD series, In general, polyamines c) usable in the present adhesive composition comprise cross-linkable polyether di- and tri-amines marketed by Huntsman Chemical under the name JEFFAMINE®.

Preferably, the polyamine c) presents low toxicity.

In the present cross-linkable adhesive composition the polyamine c) is generally present in amounts of between 0.05% and 3% by weight, preferably between 0.1% and 2% by weight.

In the present cross-linkable adhesive composition, the weight ratio of the polyamine c) to the epoxide b) is preferably greater than 0.15, more preferably greater than 0.20, even more preferably greater than 0.25.

In the present cross-linkable adhesive composition, the weight ratio of the polyamine c) to the epoxide b) is preferably less than 0.70, more preferably less than 0.60, even more preferably less than 0.55.

In the present cross-linkable adhesive composition, the weight ratio of the polyamine c) and the epoxide b), summed together, with respect to the latex a) is preferably greater than 0.20, more preferably greater than 0.30, even more preferably greater to 0.40.

In the present cross-linkable adhesive composition, the weight ratio of the polyamine c) and the epoxide b), summed together, with respect to the latex a) is less than 0.80, more preferably less than 0.70, even more preferably less to 0.60.

Generally the total amount of components a) b) c) retained by the fibrous material following a single treatment with the present adhesive composition is cross-linkable by up to 20%, preferably up to 14%, more preferably up to 10%, even more preferably up to 8% by weight, the amount being calculated on the basis of the weight of the fibrous material following dipping and drying compared to the weight of a portion of initial dry fibrous material of equal length.

The present cross-linkable adhesive composition is prepared by suitably mixing together the components a) and b) and c) in an aqueous medium.

The cross-linkable adhesive composition thus prepared is ready for use and can also be stored at room temperature.

The adhesive composition is preferably left to rest for about 24 hours at room temperature, to "mature" even though it can already be used following mixing the ingredients.

Preferably, the present composition is stable under normal ambient light, pressure, atmospheric composition and temperature conditions.

Stable means that the present composition is stored substantially unchanged for at least 7 days, preferably for at least 15 days, more preferably for at least 30 days and more, when stored at room temperature and in a normal atmosphere, that is, in the common transport and in-factory storage conditions.

This remarkable stability is a definite advantage over traditional RFL compositions or the compositions of some of the polyamines mentioned in the document WO2005/080481 tested by the Applicant.

In the present invention, the cross-linkable elastomeric material for tyres suitable for adhering following cross-linking to the elongated reinforcing element, comprises at feast one diene elastomeric polymer and at least one reinforcing filler.

Preferably, the cross-linkable elastomeric material comprises at least one cross-linkable elastomeric polymer, at least one reinforcing filler, at least one methylene donor compound, at least one methylene acceptor compound and at least one vulcanizing agent.

In the present description the composition of said cross-linkable elastomeric material (commonly known as compound) unless otherwise indicated, is expressed in phr (parts per 100 parts of rubber).

The compounds for tyres generally used in the present invention comprise 100 phr of at least one elastomeric polymer.

The term "elastomeric polymer" is an established term in the tyre sector and is used in hundreds of patents and non-patent documents. For example, we can mention the book "Elastomeric polymer networks", Eugene Guth, published by Prentice Hall in 1992. This term has been a part of common technical language in the sector for many years and is generally used to indicate a polymer with elastic properties, i.e. primarily a low Young's modulus.

In particular the compounds for tyres used in the present invention comprise at least one diene elastomeric polymer (a1) and, possibly, an elastomeric polymer (a2).

According to one embodiment, said at least one diene elastomeric polymer (al) can be selected for example from diene elastomeric polymers commonly used in elastomeric compositions cross-linkable with sulphur (vulcanizing), which are particularly suitable for the production of tyres, or from polymers or elastomeric copolymers with an unsaturated chain having a glass transition temperature (Tg) usually below 20° C., preferably in the range from 0° C. to −110° C. These polymers or copolymers can be of natural origin or can be obtained by solution polymerization, emulsion polymerization or gas phase polymerization of one or more conjugated diolefins, mixed with at least one comonomer selected from monovinylarenes and/or polar comonomers.

The conjugated diolefins normally comprise between 4 and 12, preferably between 4 and 8 carbon atoms, and can be selected for example from the group comprising: 1,3-butadiene, isoprene, 2,3-dimethyl-1,3,-butadiene, 1,3-pentadiene, 1,3-hexadiene, 3-butyl-1,3-octadiene, 2-phenyl-1,3-butadiene or mixtures thereof. Particularly preferred are 1,3-butadiene or isoprene.

Monovinylarenes, which can be used as comonomers, typically contain between 8 and 20, preferably between 8 and 12 carbon atoms and can be selected for example from: styrene; 1-vinylnaphthalene, 2-vinylnaphthalene, various alkyl, cycloalkyl, aryl, alkylaryl or arylalkyl derivatives of styrene, such as α-methylstyrene, 3-methylstyrene, 4-propylstyrene, 4-cicloesilstirene, 4-dodecylstyrene, 2-ethyl-4-benzilsfirene, 4-p-tolilstirene, 4-(4-phenylbutyl)styrene or mixtures thereof. Styrene is particularly preferred.

Polar comonomers, which may be optionally used can be selected for example from: vinylpyridine, vinylquinoline, acrylic acid and esters of acid alkylacrylic, nitriles, or mixtures thereof, such as methyl acrylate, ethyl acrylate, methyl methacrylate, ethyl methacrylate, acrylonitrile or mixtures thereof.

Preferably, the diene elastomeric polymer (al) can be selected for example from: cis-1,4-polyisoprene (natural or synthetic, optionally carboxylated, preferably natural rubber), epoxidized natural rubber (ENR), 3,4-polyisoprene, polybutadiene (in particular polybutadiene with a high content of 1,4-cis), optionally halogenated copolymers of isoprene/isobutene copolymers, 1,3-butadiene/acrylonitrile copolymers, styrene/1,3-butadiene copolymers, carboxylated copolymers of styrene/1,3-butadiene, copolymers of stirene/isoprene/1,3-butadiene, copolymers of styrene/1,3-butadiene/acrylonitrile, carboxylated copolymers of styrene/1,3-butadiene/acrylonitrile, or mixtures thereof.

Natural rubber and mixtures of natural and synthetic polyisoprene rubber are preferably used in the present invention. More in particular, the addition of synthetic polyisoprene rubber to natural rubber gives a greater tackiness to the resulting elastomeric composition.

Mixtures comprising polyisoprene (natural or synthetic) and a polymer styrene-butadiene rubber (SBR) are preferably used.

Preferably, the polyisoprene is present in the compounds of the present invention in an amount ranging between about 0.1 and 100 phr, more preferably between 95 and 70 phr.

Preferably, the styrene-butadiene polymer can come from solution or emulsion, and generally comprises styrene in an amount of between about 10 and 40%, preferably between 15 and about 30%.

Preferably, the styrene-butadiene polymer is present in the compounds of the present invention in an amount ranging between about 0 and 50 phr, more preferably between 5 and 30 phr.

The elastomeric polymer (a2) can be selected from elastomeric polymers of one or more monoolefins with an olefinic comonomer or derivatives thereof. The monoolefins can be selected from ethylene and α-olefins generally containing between 3 and 12 carbon atoms, such as, for example, propylene, 1-butene, 1-pentene, 1-hexene, 1-octene or mixtures thereof. The following are preferred: copolymers between ethylene and an α-olefin, optionally with a diene; homopolymers of isobutene or the copolymers thereof with a reduced amount of a diene, which are optionally at least partially halogenated. The optionally present diene generally contains between 4 and 20 carbon atoms and is preferably selected from: 1,3-butadiene, isoprene, 1,4-hexadiene, 1,4-cyclohexadiene, 5-ethylidene-2-norbornene, 5-methylene -2-norbornene, vinyl norbornene or mixtures thereof. Of these the following are particularly preferred: copolymers of ethylene/propylene (EPR) or ethylene/propylene/diene (EPDM); polysobutene, butyl rubbers, halobutyl rubbers, in particular chlorobutyl or bromobutyl rubbers, or mixtures thereof.

Mixtures of said diene elastomeric polymers (a1) with said elastomeric polymer (a2) can be used.

Preferably, the elastomeric composition comprises at least one reinforcing filler.

Said at least one reinforcing filler can be selected from those commonly used for cross-linked manufactured products.

For example, carbon black, silica, alumina, aluminosilicates, calcium carbonate, kaolin, or mixtures thereof are preferred. Carbon black, silica and mixtures thereof are particularly preferred.

A minimum quantity of said at least one reinforcing filler of about 20 phr is preferably added to the elastomeric composition.

More preferably, this minimum quantity can be of about 30 phr. Preferably, said at least one reinforcing filler is added to an elastomeric composition in an amount not exceeding about 80 phr, more preferably not exceeding about 70 phr.

In the present invention, said cross-linkable elastomeric material preferably comprises at least one donor compound methylenes.

According to a preferred embodiment, said at least one methylene donor compound can be any compound which, when heated during vulcanization, is able to react with the methylene acceptors used in the elastomeric composition.

Examples of suitable methylene donors comprise, but are not limited to, hexamethylenetetramine (HEXA or HMT), hexamethoxymethylmelamine (HMMM), hexamethylmelamine, N,N'-dimethylalurea, N-methylol dicyanamide, N-allyl dioxazine, N-phenyl dioxazine, N-methylol-acetamide, N-methylol-butirammide, N-methylol-acrylamide, N-methylol-succinimide, laurel oxymethylpyridium chloride, ethoxymethylpyridium chloride, trioxan hexamethoxymethylmelamine, as described for example in U.S. Pat. No. 3,751,331, preferably HMMM.

The methylene donor is usually present in concentrations between about 0.5 and 15 phr, preferably between 0.5 and 10 phr.

In the present invention, said cross-linkable elastomeric material preferably comprises at least one methylene acceptor compound.

According to a preferred embodiment, said at least one methylene acceptor compound can be any compound capable of reacting during vulcanization with the methylene donor used in the elastomeric composition.

Examples of suitable methylene acceptors comprise, but are not limited to, phenolic resins derived from the reaction of phenol and/or substituted phenols with formaldehyde.

The term "phenolic resin" refers to the family of polymers obtained by reaction between phenol and formaldehyde; generally said phenolic resins in turn divide into novolacs and resols on the basis of the ratio of the two reagents.

In particular, the novolacs are generally prepared with an aldehyde ratio: phenol less than 1 and an acid catalysis, while with a ratio aldehyde: phenol greater than 1 and a basic catalysis the resols are obtained.

In addition to phenol, mixtures of ortho-cresol, para-cresol and meta-cresol can also be employed as well as dihydroxy phenols, such as resorcinol and pyrocatechol, polyhydroxy phenols, such as pyrogallol and phloroglucinol, however resorcinol and other toxic or potentially harmful dihydroxyphenyls are preferably not used.

In addition to formaldehyde, other aldehydes can be used instead of or in mixture with formaldehyde; among these acetaldehyde and furfural.

Phenolic resins prepared by polymerization of phenol and formaldehyde, more preferably novolacs, even more preferably novolacs with low free monomer content (phenol) are preferably used as methylene acceptors in the present invention.

Preferred methylene acceptors are for examples the resins marketed under the name Alnovol PN760 (CYTEC) or ELASTOBOND A250 (SI Group).

Products of natural origin having a poly-phenolic structure such lignin and the derivatives thereof may also be suitable as methylene acceptors.

Lignin is a heavy and complex organic polymer derived from biomass of plant origin, wood etc.

The lignin molecule consists of three different monomers: p-coumaric alcohol, coniferyl alcohol (4-hydroxy-3-methoxycinnamyl alcohol) and sinapyl alcohol (4-hydroxy-3,5-dimethoxycinnamyl alcohol), which are combined in different proportions depending on the nature of the biomass from which they are derived.

The polyphenolic structure of lignin and the derivatives thereof makes these materials reactive towards said described methylene donor compounds.

The lignin can be separated from the cellulose by several processes: one of these is the Kraft process wherein sodium sulphide and sodium hydroxide are used: the kraft lignins are obtained as dispersants for dyes and pesticides. Commercial products are INDULIN AT, IN DULIN C of Mead-Westvaco.

Lignin can also be obtained through the bio fuel production process: in particular, the ethanol production process by enzymatic means, which allows the lignin to be effectively separated from the cellulose, is of great interest.

Suitable lignin derivatives are lignin sulphonates of alkaline metals or alkaline earth or mixed metals. The lignin sulphonates are products deriving from the separation of cellulose from wood pulp through the reaction process with sodium, calcium, potassium, magnesium or ammonium sulphite/bisulphite mixtures.

Examples are the materials of Borregaard, BORRESPERSE NA (sodium salt), BORRESPERSE CA (calcium salt), etc.

Furthermore, malonates, carbamates, amides and urea and blocked isocyanates can be suitable methylene acceptors. Given equal performance, low toxicity methylene donors and acceptors are particularly preferred.

The methylene acceptor is usually present in concentrations of between about 0.5 and 15 phr, preferably between 0.5 and 10 phr.

The weight ratio between methylene donor and methylene acceptor can vary, but generally ranges between 1:10 and 10:1. Preferably, the weight ratio between methylene donor and methylene acceptor varies between 1:3 and 3:1.

In the present invention, said cross-linkable elastomeric material comprises at least one vulcanizing agent.

The vulcanizing agent most advantageously used is sulphur, or molecules containing sulphur that act as sulphur donors, with accelerators, activators and/or retardants known to those skilled in the art.

The sulphur or the derivatives thereof may be advantageously selected, for example, from: (i) soluble sulphur (crystalline sulphur); (ii) insoluble sulphur (polymeric sulphur); (iii) sulphur dispersed in oil (example 33% sulphur known by the commercial name of Crystex OT33 by Flexsys); (iv) sulphur donor such as, for example, caprolactam disulphide (CLD), bis[(trialkoxysilyl)propyl]polysulphides, dithiophosphates or mixtures thereof.

Said sulphur or derivatives thereof, are preferably used in the elastomeric composition in an amount of between about 0.05 phr and about 10 phr. More preferably, said sulphur or derivatives thereof are used in the elastomeric composition in an amount of between about 0.1 phr and about 5 phr. Even more preferably, said sulphur or derivatives thereof are used in the elastomeric composition in an amount of between about 0.2 phr and about 2 phr.

The elastomeric composition can be vulcanized according to the techniques of the prior art.

To this end, following one or more thermo-mechanical process steps, a sulphur-based vulcanizing agent is incorporated in the composition preferably together with vulcanization activators and accelerators. In the final stage of the process, the temperature is generally kept below 120° C. and preferably below 100° C., so as to avoid any undesired pre-cross-linking.

According to a further preferred embodiment, the elastomeric composition may further comprise at least one vulcanization activator.

Vulcanization activators, which are particularly effective, are the compounds of zinc. In particular ZnO, $ZnCO_3$, zinc salts of saturated or unsaturated fatty acids containing between 8 and 18 carbon atoms are used.

For example, in the elastomeric composition zinc stearate, preferably formed in situ, from ZnO and fatty acid, as well as MgO, or mixtures thereof is used.

Said vulcanization activators are preferably used in the elastomeric composition in an amount of between about 0.5 phi and about 10 phr. More preferably, said activating vulcanization are used in the elastomeric composition in an amount of between about 1 phi and 5 phr. Even more preferably, said activating vulcanization are used in the elastomeric composition in an amount of between about 1.5 phr and 3.5 phr.

According to a further preferred embodiment, the elastomeric composition may further comprise at least one vulcanization accelerator.

Vulcanization accelerators that are commonly used can be selected from, for example, dithiocarbamates, guanidines, thioureas, thiazoles, sulphonamides, thiurams, amines, xanthates or mixtures thereof.

Such vulcanization accelerators are preferably used in the elastomeric composition in an amount of between about 0.05 phr and about 10 phr. More preferably, said vulcanization accelerators are used in the elastomeric composition in an amount of between about 0.1 phr and about 5 phr. Even more preferably, said vulcanization accelerators are used in the elastomeric composition in an amount of between about 0.5 phr and about 3 phr.

The elastomeric composition may comprise other commonly used additives selected on the basis of the specific application for which the composition is intended. For example, the following additives can be added to said elastomeric composition: anti-aging, anti-reversion agents, plasticizers, adhesives, antiozonants, in particular of the p-phenylenediamine type), waxes, resin modifiers, fibres (for example Kevlar pulp®) or mixtures thereof.

DESCRIPTION OF THE DRAWINGS

Said description will be provided hereunder with reference to the accompanying drawings, which are provided for illustrative purposes only and are not therefore exhaustive, wherein:

In FIG. 1, "a" indicates an axial direction and "X" indicates a radial direction. For simplicity, FIG. 1 shows only a portion of the tyre, the remaining not represented portion being identical and symmetrically arranged with respect to the radial direction "X". The tyre 100 for four-wheeled vehicles (motor vehicles) comprises at least one carcass structure comprising at least one carcass layer 101 having respectively opposed end flaps that are engaged with respective annular anchoring structures 102 known as bead wires, possibly associated with a bead filler 104. The tyre area comprising the bead wire 102 and the bead filler 104 form an annular reinforcing structure 103, bead structure, intended for the anchoring of the tyre onto a corresponding mounting rim, not illustrated. The carcass structure is usually of the radial type, i.e. the reinforcing elements of the at least one carcass layer 101 are located on planes comprising the axis of rotation of the tyre and substantially perpendicular to the equatorial plane of the tyre. Said reinforcement elements generally consist of textile cords, for example rayon, nylon, polyester (for example polyethylene naphthalate-PEN) cords preferably treated with a cross-linkable adhesive composition comprising at least a) a rubber latex, at least b) an epoxide, and c) a polyamine of molecular weight greater than 190 Daltons, and comprising at least two amino groups selected from primary —NH$_2$ and —NH— and secondary amino groups preferably with an elastomeric material comprising at least one diene elastomeric polymer and at least one reinforcing filler.

Figure 1:
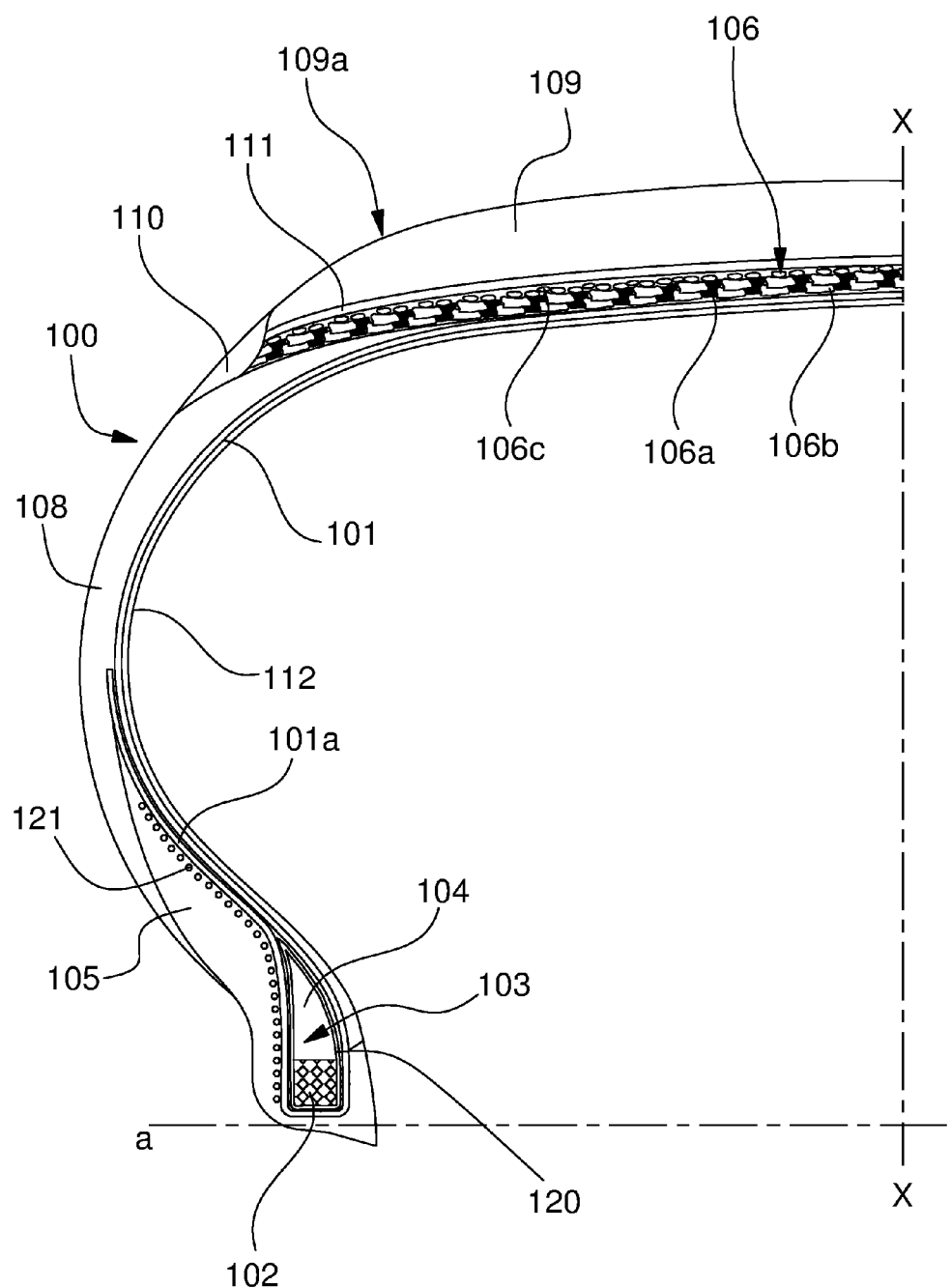
FIG. 1 illustrates a partial radial cross-section tyre for motor vehicle wheels.

Each bead structure is associated with the carcass structure by backward folding of the opposite side edges of the at least one carcass layer 101 around the annular anchoring structure 102 so as to form the so-called carcass flaps 101a as illustrated in FIG. 1.

In one embodiment, the coupling of the carcass structure and bead structure can be provided by a second carcass layer (not shown in FIG. 1) applied in an axially external position with respect to the first carcass layer.

An anti-abrasive strip 105 made of elastomeric material is arranged in a position external to each bead structure 103.

The carcass structure is associated with a belt structure 106 comprising one or more belt layers 106a, 106b placed in radial superposition with respect to each other and with respect to the carcass layer, having metal or textile reinforcing cords. In the event of textile cords these are preferably treated with a cross-linkable adhesive composition comprising at least a) a rubber latex, at least b) an epoxide and at least c) a polyamine of molecular weight greater than 190 Dalton, comprising at least two amino groups selected from primary and secondary —NH$_2$ and —NH— amino acid groups that are preferably rubberized with an elastomeric material comprising at least one diene elastomeric polymer and at least one reinforcing filler. These reinforcement cords may have a crossed orientation with respect to a direction of circumferential development of the tyre 100. "Circumferential" direction means a direction generally facing the direction of rotation of the tyre.

In a position that is radially outermost to the belt layers 106a, 106b at least one reinforcing layer can be applied at zero degrees 106c, commonly known as "0° belt", which generally incorporates a plurality of reinforcing cords, typically textile cords, oriented in a substantially circumferential direction, thus forming an angle of a few degrees (for example an angle between about 0° and 6°) with respect to the equatorial plane of the tyre, and coated with an elastomeric material following tackifying treatment preferably performed with a cross-linkable adhesive composition comprising at least a) a rubber latex, at least b) an epoxide and at least c) a polyamine of molecular weight greater than 190 Dalton, comprising at least two amino groups selected from primary —NH$_2$ and secondary —NH— amino groups.

A tread 109 in elastomeric compound, like other semi-finished products making up the tyre 100, is applied in a position radially external to the belt structure 106.

Respective sidewalls 108 in elastomeric compound are also applied in an axially external position on the side surfaces of the carcass structure, each extending from one of the side edges of the tread 109 to the level of the respective bead structure 103.

The tread 109 has a rolling surface 109a, in a radially external position, intended to come in contact with the ground. Circumferential grooves, which are connected by transverse notches (not represented in FIG. 1) so as to define a plurality of blocks of various shapes and sizes distributed over the rolling surface 109a, are generally produced in this surface 109a, which for simplicity is represented smooth in FIG. 1.

A substrate 111 may be arranged between the belt structure 106 and the tread 109.

A strip consisting of elastomeric material 110, commonly known as "mini-sidewall", can be present in the connecting area between the sidewalls 108 and the tread 109, this mini-sidewall generally being obtained by co-extrusion with the tread 109 and allowing an improvement of the mechanical interaction between the tread 109 and sidewalls 108. Preferably, the end portion of the sidewall 108 directly covers the lateral edge of the tread 109.

In the case of tyres without an inner tube, a layer of rubber 112, generally known as "liner", which provides the necessary impermeability to tyre inflation air, can also be envisaged in a radially inward with respect to the carcass layer 101.

Tyre sidewall 108 rigidity can be improved by equipping the tyre bead structure 103 with a reinforcing layer 120 generally known as "flipper" or additional strip-like insert.

The flipper 120 is a reinforcing layer that is wrapped around the respective bead wire 102 and bead filler 104 so as to at least partially surround, said reinforcing layer, being arranged between the at least one carcass layer 101 and the bead structure 103. Typically, the flipper is in contact with said at least one carcass layer 101 and said bead structure 103.

The flipper 120 typically comprises a plurality of textile or metal cords incorporated in a cross-linked elastomeric material, when the cords are textile cords (for example aramide or rayon) they are preferably preventively treated with said cross-linkable adhesive composition.

The bead structure 103 of the tyre may comprise an additional protection layer that is generally known by the term "chafer" 121 or protective strip and that has the function of increasing rigidity and integrity of the bead structure 103.

The chafer 121 usually comprises a plurality of cords incorporated into a cross-linked elastomeric material and which are generally made of textile materials (for example aramid or rayon) preferably preventively treated with said cross-linkable adhesive composition, or metal materials (for example of steel cord).

Preferably, the cross-linked elastomeric material suitable for incorporating the textile cords of said at least one carcass layer and/or said at least one belt layer and/or flipper and/or chafer layer is obtained by cross-linking a cross-linkable elastomeric material comprising at least one diene elastomeric polymer and at least one reinforcing filler.

Preferably, said cross-linkable elastomeric material comprises at least one cross-linkable elastomeric polymer, at least one reinforcing filler, at least one methylene donor compound, at least one methylene acceptor compound and at least one vulcanizing agent. Even more preferably, said methylene acceptor compound is a phenolic resin, preferably a novolac.

According to an embodiment not illustrated, the tyre can be a tyre for the wheels of heavy-duty vehicles, such as lorries, buses, trailers, vans, and in general for vehicles wherein the tyre is subjected to a high load.

Such a tyre is preferably adapted to be mounted onto rims having a diameter equal to or greater than 17.5 inches for directional or trailer wheels. A heavy-duty transport vehicle, for example a vehicle of the M2, M3, N2, N3, O2, O3 and O4 categories according to the "ECE Consolidated Resolution of the Construction of vehicles (RE3), Annex 7, Classification and definition of power-driven vehicles and trailers" or of the M3, N2, N3, O3, O4 categories according to the "ETRTO engineering design information" (ed. 2010), the "General Information", p. G15 and G16, "International codes for wheeled vehicle classification as UN/ECE 29/78 and Directive 2003/37" chapter. The heavy-duty vehicles category comprises trucks, lorries, tractor-trailers, vans, buses and similar vehicles.

The tyre for the wheels of heavy-duty vehicles comprises at least one carcass ply, the opposite lateral edges of which are associated with respective bead structures, the so-called bead, comprising an annular anchoring structure, known as bead wire, and at least one bead filler. The association between said at least one carcass ply and said bead structure is typically obtained folding over the opposite side edges of said at least one carcass ply around said annular anchoring structure and said at least one bead filler so as to form a flap carcass.

An anti-abrasive strip made of elastomeric material can be arranged in an external position with respect to each bead structure.

Said at least one carcass ply generally comprises a plurality of reinforcing elements of the carcass ply arranged substantially parallel to one another and at least partially coated with a layer of elastomeric material. These reinforcing elements of the carcass ply, in particular in the case of lorry tyres, usually comprise metal cords, preferably made of steel.

Said at least one carcass ply is usually of the radial type, that is it incorporates reinforcing elements arranged in a direction substantially perpendicular to the circumferential direction.

A belt structure is applied in a radially external position with respect to said at least one carcass ply.

The belt structure comprises at least two belt bearing layers that are radially superimposed and incorporate a plurality of reinforcing belt elements, typically metal cords, preferably made of steel. The belt structure may also comprise a reinforcing layer at zero degrees applied, for example, in a radially external position with respect to the second bearing belt layer.

The metal cords used in the layers of the belt structure, and in particular those used in the layers of bearing belt layers, comprise a plurality of wires.

The wires of the metal cords used in the belt structure (and typically also in other tyre reinforcing layers) are preferably steel wires NT (normal tensile), HT (high tensile), SHT (Super High Tensile) or UHT (ultra high tensile). Typically, these steel wires have a carbon content of less than about 1%. Preferably, the carbon content is greater than or equal to about 0.7%. The wires are typically coated with brass or other corrosion-resistant coating (for example Zn/Mn).

A tread is applied circumferentially in a radially external position with respect to said belt structure. Externally, the tread has a rolling surface suitable for coming into contact with the ground.

Some circumferential grooves, which can be connected by transverse notches (not represented), define a tread pattern which comprises a plurality of ribs and/or blocks of various shapes and sizes, distributed on the rolling surface.

A sidewall is applied externally on the carcass ply. The sidewall extends in an axially external position, from the bead structure to the tread.

A substrate is arranged at the level of the area, where the side edges of the tread connect with the sidewall.

An elastomeric layer, generally known as a liner, which provides the necessary impermeability to tyre inflation air, can be provided at a radially inward position with respect to the carcass ply.

The rigidity of the tyre sidewall for heavy-duty vehicles can be improved by equipping the tyre bead structure with a reinforcing layer generally known as "flipper" or additional strip-like insert.

The flipper typically comprises a plurality of textile or metal cords incorporated in a cross-linked elastomeric material, when the cords are textile (for example aramide or rayon) they are preferably preventively treated with said cross-linkable adhesive composition.

The bead structure of tyres for heavy-duty vehicles may comprise an additional protection layer that is generally known by the term "chafer" or protection strip and which has the function of increasing the rigidity and integrity of the structure.

The chafer usually comprises a plurality of cords preferably incorporated in a cross-linked elastomeric material and which are generally made of textile materials (for example aramid or rayon) preventively tackified by means of tackifying treatment preferably performed with said cross-linkable adhesive composition or in metal materials (for example steel cords).

Preferably, the cross-linked elastomeric material suitable for producing the flipper and/or the chafer is obtained by cross-linking a cross-linkable elastomeric material comprising at least one diene elastomeric polymer and at least one reinforcing filler. Preferably, said cross-linkable elastomeric material comprises at least one cross-linkable elastomeric polymer, at least one reinforcing filler, at least one methylene donor compound, at least one methylene acceptor compound and at least one vulcanizing agent. Even more preferably, said methylene acceptor compound is a phenolic resin, preferably a novolac.

Figure 2:
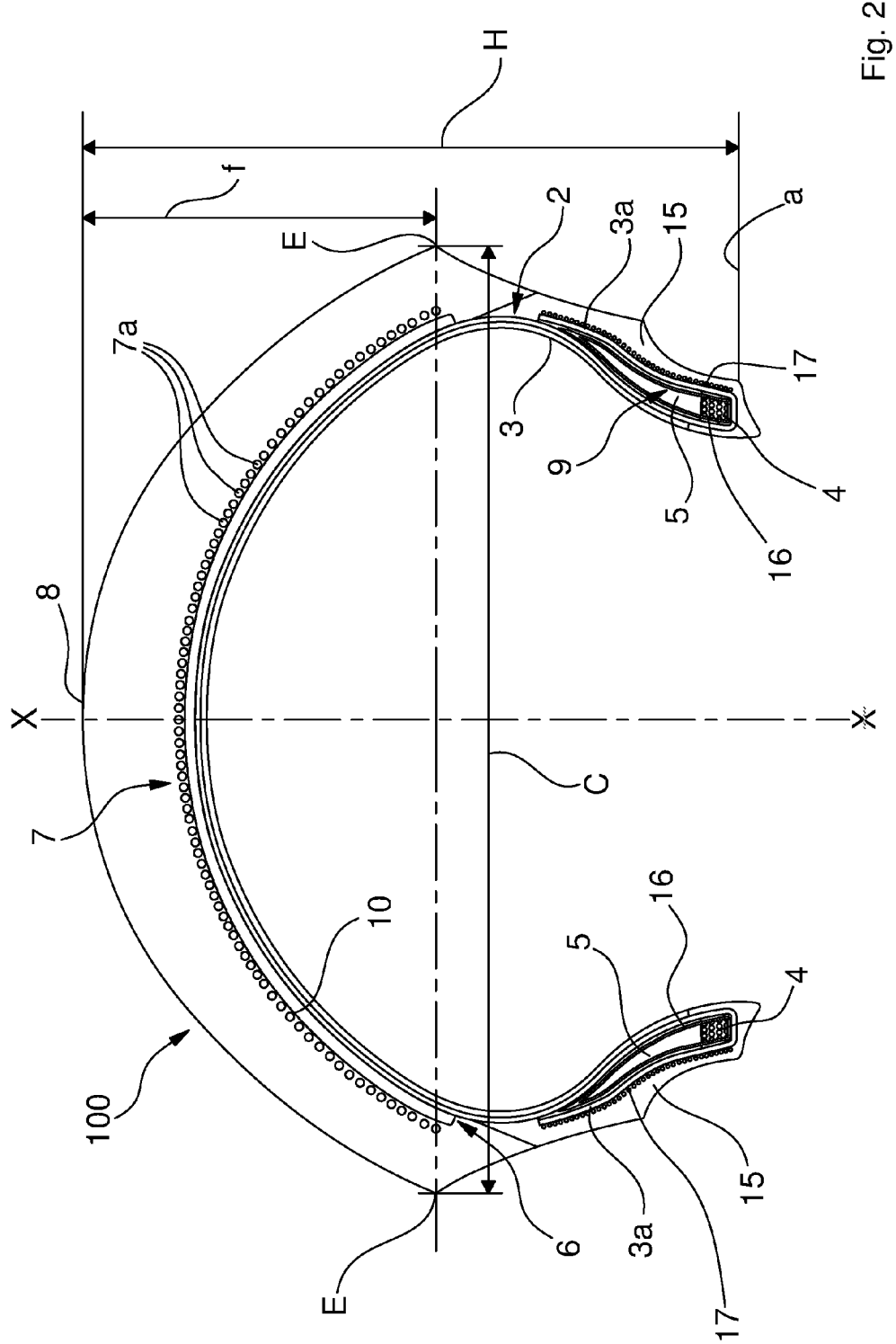
FIG. 2 schematically shows a radial section of a tyre for motor vehicles.

In FIG. 2, 100 is globally indicates a tyre for the wheels of motor vehicles.

The tyre 100 defines an equatorial plane XX and a rotation axis Z (not shown in the figure). A circumferential direction (indicated in the figures by the arrow f oriented in the direction of rotation of the tyre) and an axial direction perpendicular to the equatorial plane XX are also defined.

The tyre 100 comprises a carcass structure 2 including at least one carcass ply 3, made of elastomeric material and comprises a plurality of reinforcing elements arranged parallel to each other.

The carcass ply 3 is engaged, by means of its opposite circumferential edges, to at least one bead structure 9.

In particular, the opposite side edges 3a of the carcass ply 3 are folded back around the annular anchoring structures 4, known as bead wires.

A tapered bead 5, which occupies the space defined between the carcass ply 3 and the corresponding side edge 3a of the folded carcass ply 3, is applied on the axially outer peripheral edge of bead wires 4.

The area of the tyre comprising the bead wire 4 and the filling 5 forms a bead structure 9, the so-called bead, intended for anchoring the tyre onto a corresponding mounting rim, not shown.

The anti-abrasive strip 15 is arranged in a position outside of each bead structure 9.

The reinforcing elements included in the carcass ply 3 preferably comprise textile cords, selected among those usually adopted in the package of tyre carcasses, for example nylon, rayon, PET, PEN, with elementary wire having a diameter of between 0.35 mm and 1.5 mm, incorporated in a cross-linked elastomeric material said textile cords are preferably preventively treated with said cross-linkable adhesive composition.

In an embodiment that is not illustrated, the carcass structure presents its opposite lateral edges associated with no fold over to particular bead structures provided with two annular inserts. A filler made of elastomeric material can be arranged in an axially external position to the first annular insert. The second annular insert is, instead, arranged in a axially external position to the end of the carcass ply. Lastly, a further filler can be envisaged, in an axially external position to said second annular insert, and not necessarily in contact therewith, which terminates the production of the bead structure.

Typically a belt structure 6 comprising one or more belt layers placed radially superimposed with respect to each other and with respect to the carcass layer, having reinforcing cords metal or textiles, is typically circumferentially applied in a radially external position of the carcass structure 2.

The belt structure 6 is circumferentially superimposed with a tread 8 on which, following a moulding operation carried out simultaneously with the vulcanization of the tyre, longitudinal and/or transverse grooves are typically produced, arranged to define a desired tread.

The tyre 100 can comprise a pair of sidewalls laterally applied from opposite sides of said carcass structure 2.

The tyre sidewall rigidity for motor vehicles can be improved by equipping the bead structure 9 with a reinforcing layer generally known as "flipper" 16 or additional strip-like insert.

The flipper 16 is wrapped around the respective bead wire 4 and the bead filler 5 so as to at least partially surround them, said reinforcing layer being arranged between the at least one carcass ply 3 and the bead structure 9.

The bead structure 9 of tyres for motor vehicles may comprise an additional protection layer that is generally known by the term "chafer" 17 or protection strip and which has the function of increasing rigidity and integrity of the bead structure 9.

The flipper and/or the chafer usually comprise a plurality of textile cords (for example aramid or rayon) incorporated in a cross-linked elastomeric composition and preferably preventively treated with said cross-linkable adhesive composition.

Preferably, the tyre 100 for motor vehicles presents a straight section characterized by a high transverse curvature.

In particular, the tyre 100 for motor vehicles has a section height H measured on the equatorial plane, between the height of the tread and the rim diameter, identified by the reference line a, passing through the tyre beads.

The tyre 100 for motor vehicles further has a width C defined by the distance between the laterally opposite ends E of the tread itself, and a curvature defined by the particular value of the ratio between the distance f of the tread crown from the line through the ends E of the tread itself, measured on the equatorial plane of the tyre and the aforementioned width C. The ends E of the tread can be formed with an edge.

Tyres having high curvature are tyres which present a curvature ratio of f/C no less than 0.2, preferably f/C≥0.25, for example 0.28. Preferably, such a curvature ratio f/C is not in excess of 0.8, preferably f/C≤0.5.

The tyres preferably present particularly low sidewalls. In other words, tyres with low or low profile sidewalls are tyres wherein the sidewall height ratio (Hf)/H is less than 0.7, more preferably less than 0.65, for example 0.6.

In a preferred embodiment, the motor vehicle tyre is intended to be mounted onto the rear wheel having cord dimensions substantially comprised between 100 and 260 mm.

In a preferred embodiment, the tyre is intended to be mounted onto the front wheel of a motor vehicle having cord dimensions substantially comprised between 80 and 140 mm.

Preferably, the distance (f) between the radially external point of the tread and the line passing through the laterally opposite ends of the tread itself of the front tyre can be substantially comprised between 45 and 65 mm. Preferably, the transverse/cord curve ratio (f/C) can be substantially comprised between 0.35 and 0.70, even more preferably between 0.35 and 0.60. Preferably, the (total height)/cord (H/C) ratio is substantially between 0.6 and 1.

In the event of tyres without inner tube, the carcass structure 2 is typically coated on its inner walls by a sealing layer, or so-called "liner", essentially consisting of a layer of elastomeric material that is impermeable to air, adapted to ensure the hermetic seal of the tyre itself once inflated.

Preferably, the belt structure 6 consists of a layer 7 which presents a plurality of circumferential windings 7a axially arranged side by side, formed by a rubberized cord or by a narrow band comprising a number of rubberized cords (preferably two to five), spirally wound with a substantially zero angle (typically between 0° and 5°) with respect to the equatorial plane X-X of the tyre.

The belt structure preferably extends substantially over the entire crown portion of the tyre.

In a preferred embodiment, the belt structure 6 can consist of at least two radially superimposed layers, each consisting of elastomeric material reinforced with cords arranged parallel to each other. The layers are arranged in such a way that the cords of the first belt layer are oriented obliquely with respect to the equatorial plane of the tyre, whereas the cords of the second layer also present oblique orientation, but symmetrically crossed with respect to the cords of the first layer (the so-called "cross-belt").

In both cases, the cords of the belt structure are generally textile or metal cords. In the case of textile cords, for example rayon, nylon, polyester (for example polyethylene naphthalate-PEN) and aramids, these are incorporated in a cross-linked elastomeric material. Said textile cords are preferably preventively treated with said cross-linkable adhesive composition.

Preferably, the cross-linked elastomeric material suitable for incorporating the textile cords of said at least one carcass layer and/or said at least one belt layer and/or the flipper and/or the chafer is obtained by cross-linking a cross-linkable elastomeric material comprising at least one diene elastomeric polymer and at least one reinforcing filler.

Preferably, said cross-linkable elastomeric material comprises at least one cross-linkable elastomeric polymer, at least one reinforcing filler, at least one methylene donor compound, at feast one methylene acceptor compound and at least one vulcanizing agent. Even more preferably, said methylene acceptor compound is a phenolic resin, preferably a novolac.

Preferably, the tyre 100 may comprise a layer of elastomeric material 10 placed between said carcass structure 2 and said belt structure 6.

The building of tyres 100 as described above, can be implemented by means of the assembly of respective semi-finished products on a building drum, not illustrated, by at least one assembling device.

At least a part of the components intended to form the carcass structure of the tyre can be constructed and/or assembled on the building drum. More in particular, the building drum lends itself to first receiving any liner, subsequently the carcass structure and the anti-abrasive strip. Subsequently, devices that are not illustrated coaxially engage one of the annular anchoring structures around each of the end flaps, placing an outer sleeve comprising the belt structure and the tread in a coaxially centred position around the cylindrical carcass sleeve and shape the carcass sleeve on the basis of a toroidal configuration by means of a radial expansion of the carcass structure, so as to determine the application thereof against a radially inner surface of the outer sleeve.

Following the assembly of the green tyre, a moulding and vulcanization treatment is performed with a view to determining the structural stabilization of the tyre through cross-linking of the elastomeric compounds and to impart a desired tread pattern on the tread and to stamp any distinctive graphic signs at the level of the sidewalls.

The present invention is further illustrated in the following experimental part, proposed purely by way of a non-limiting example.

Experimental Part

In the present experimental part the adhesion between cords—pre-treated with the present cross-linkable adhesive composition or with compositions of the prior art—and compounds, as described in detail hereunder, was evaluated with the following tests:

adhesion test (H-test, by pull-out), measuring the force required to pull out the cord from the block of elastomeric material of the sample following vulcanisation, performed according to the method ASTM D4776 (maximum pull out force); the specific vulcanization conditions and the measured data are recorded in Table 3a.

"peel" test (peel or strap adhesion) performed according to the ASTM D4393 method, in the version "Strap Peel Adhesion From Single Cord", with a specimen width of 20 mm, with measurement of the maximum force applied and an assignment of a sample observation score following tearing, as shown in Table 1:

TABLE 1

| Mark | Degree of coating |
|---|---|
| 5 | 100% |
| 4 | up to 75% |
| 3 | up to 50% |
| 2 | up to 25% |
| 1 | 100% de-rubberized cords |

The maximum score of 5 indicates an excellent adhesion between elastomeric material and cords, which remain completely covered with rubber following tearing. In this case sample breakage only takes place within the mass of the rubber. Conversely, a score of 1 indicates a poor adhesion and the total removal of the rubber cords following the tear.

The vulcanization conditions of the specimens and the test data are recorded in table 4.

The following tackifying compositions were prepared according to traditional procedures:

Traditional epoxide-based pre-activation composition 1;

traditional RFL-based composition 2;

comparative compositions 3-7 according to the teachings of WO2005/080481;

compositions 8-13 according to the invention, with the components and amounts (in grams) shown in the following tables 2a and 2b below:

TABLE 2a

| Compositions (comparative) | C-1 | C-2 | C-3 | C-4 | C-5 | C-6 | C-7 |
|---|---|---|---|---|---|---|---|
| Ingredients | | | | | | | |
| Water | 980 | 792.3 | 930 | 930 | 930 | 923.4 | 931.3 |
| Resorcinol resin/formaldehyde | — | 27.8 | — | — | — | — | — |
| Formaldehyde | — | 6.9 | — | — | — | — | — |
| Ammonia | — | 10.3 | — | — | — | — | — |
| Dry Latex (a) | — | 1637 | 46.7 | 46.7 | 46.7 | 46.7 | 38.8 |
| Epoxide (b) | 20 | — | 19.6 | 19.6 | 19.6 | 26.2 | 26.2 |
| Amine (c) | — | — | 3.7 Pip | 3.7 DtA | 3.7 DCH99 | 3.7 DCH99 | 3.7 DCH99 |
| Solids content | 2% | 21% | 7% | 7% | 7% | 7.7% | 7% |
| Amine/Epoxide | — | — | 0.19 | 0.19 | 0.19 | 0.14 | 0.14 |
| (Amine + Epoxide/Latex) | — | — | 0.50 | 0.50 | 0.50 | 0.64 | 0.77 |
| Example (tab 3 and 4) | C-1 C-4 | C-1 C-4 | C-2 | — | C-3 | — | — |

TABLE 2b

| Compositions (invention) | I-8 | I-9 | I-10 | I-11 | I-12 | I-13 |
|---|---|---|---|---|---|---|
| Ingredients | | | | | | |
| Water | 930 | 926.5 | 930 | 930 | 930 | 930 |
| Resorcinol resin/formaldehyde- | — | — | — | — | — | — |
| Formaldehyde | — | — | — | — | — | — |
| Ammonia | — | — | — | — | — | — |
| Dry Latex (a) | 46.7 | 46.7 | 46.7 | 46.7 | 46.7 | 46.7 |
| Epoxide (b) | 17.5 | 17.5 | 19.6 | 17.5 | 17.5 | 17.5 |
| Amine (c) | 5.8 JD230 | 9.3 JD230 | 3.7 JD230 | 5.8 JSD231 | 5.8 JD400 | 5.8 JSD401 |
| Solids content | 7% | 7% | 7% | 7% | 7% | 7% |
| Amino/Epoxide | 0.33 | 0.53 | 0.19 | 0.33 | 0.33 | 0.33 |
| (Amine + Epoxide/Latex) | 0.50 | 0.57 | 0.50 | 0.5 | 0.5 | 0.5 |
| Example (tab 3 and 4) | I-1. I-3 | I-2 | — | I-4 | I-5 | I-6 |

Keys Table 2a and 2b
Total weight of the compositions: 1,000 g
Solids content: % by weight (dry)
Amino/Epoxide and (Amino+Epoxide)/Latex: are weight ratios of the components (dry)
Resorcinol resin/Formaldehyde (pre-condensed): Penacolite R50, 50% aqueous solution, marketed by Indspec.
Latex a): Pliocord VP106S styrene/vinylpyridine latex marketed by Eliokem
Epoxide (b): for all the compositions except composition 1, GE500 Polyglycerol polyglycidyl ether, for composition 1: GE100 glycerol glycidyl ether; marketed by Raschig
Amino c): the below are considered amines (according to the prior art) and polyamines c) according to the invention, in particular:
Pip=Piperazine (marketed by Dow Chemical Company),
DtA=Dytek A: 2-methylpentamethyenediamine,
DCH99=Dytek DCH99; 1,2-diaminocyclohexane (marketed by Invista);
JD230=Jeffamine D230 (primary diamine of formula I, wherein X about 2.5, pm about 230 pm),
JD400=Jeffamine D400 (primary diamine of formula I, wherein X about 6.1, pm about 430); JSD231=Jeffamine SD-231 (secondary diamine derived from Jeffamine D-230, pm about 315); JSD401=Jeffamine SD-401 (secondary diamine derived from Jeffamine D-400, pm about 515); (marketed by Huntsman)

Given an equal solids content, the compositions according to the invention (8-13) proved is to be more stable than those (4-7) comprising amines in accordance with the teachings of WO2005/080481, in particular it was observed that:
- the composition 4 is unusable as unstable (rapid flocculation);
- the composition 5 was fairly stable in the laboratory at 7° C. but not at room temperature and under conditions of transport and industrial use; it was employed in the preparation of the samples, however, it does not have suitable characteristics for use in actual industrial conditions;
- the composition 6 resulted unstable: the rapid coagulation of the components was in fact observed at room temperature. We did not proceed further in the preparation of the samples;
- the composition 7 resulted unstable: it had in fact already hardened after one day in the laboratory at 7° C., and did not therefore appear usable at an industrial level. We did not proceed further in the preparation of the samples;

on the other hand, the compositions 8-13 according to the invention proved to be stable for at least 8 days, in some cases for at least 30 days, thus being particularly advantageous for industrial application.

Some cords made of Aramid 1670×2 (31.5×31.5) Twaron 1000 marketed by Teijin Twaron 1000 were then impregnated by dipping (single or double, as specified in the tables 3 and 4 below) with the compositions recorded in tables 2a and 2b, in particular with the compositions 1 and 2 (comparative example C-1 traditional RFL treatment), with the compositions 3 and 5 (comparative example C-2 with piperazine and C-3 with 1,2-diaminocyclohexane, according to the teachings of WO2005/080481), and with the compositions 8, 9, 11, 12 and 13 (Examples from I-1 to I-5 according to the invention).

In particular, the raw cords were dipped at room temperature in a bath having the compositions recorded in the table and dried for 120 s at 150° C. under an imposed load of 8.5 N in a forced air circulation stove; the drying step is followed by a cross-linking step for 90 s at 240° C., with constant tension always equal to 8.5 N.

The cords thus treated were coupled with the compound 1 (traditional compound with resorcinol) and 2 (resorcinol-free compound)—the detailed compositions of which are recorded in table 5—to give representative samples of structural reinforced tyre elements. The samples were prepared in accordance with the guidelines as set out in ASTM 04776 and ASTM D4393 and subjected to adhesion evaluation, in accordance with the respective procedures as per ASTM standards.

In particular, table 3a records the average force values (adhesion data, H-test) on 9.52 mm specimens measured according to standard ASTM D4776 and expressed in Newton, with the standard deviation values in brackets. The vulcanization conditions of the samples are of 30 minutes at 151° C.

TABLE 3a

| Example (C/I) | C-1 | C-2 | C-3 | I-1 | I-2 |
|---|---|---|---|---|---|
| Composition | 1 + 2 epoxide, RFL | 3 Piperazine | 5 DCH99 | 8 JD230 | 9 JD230 |
| Treatments | double | single | double | single | single |
| Compound 1 | 201 (8) | 163 (4) | 180 (5) | 180 (7) | 168 (10) |
| Compound 2 | 196 (20) | 187 (11) | — | 195 (6) | 172 (4) |

The diameter of the cords is equal to 0.67 mm, therefore by normalizing with respect to the interface between cord and compound—an area that is given by $\pi$*cord diameter*embedded length=$\pi$0.67 mm*9.52 mm=6.38 mm$^2$—the values shown in table 3b, expressed in N/mm$^2$, are obtained:

TABLE 3b

| Example (C/I) | C-1 | C-2 | C-3 | I-1 | I-2 |
|---|---|---|---|---|---|
| Composition | 1 + 2 epoxide, RFL | 3 Piperazine | 5 DCH99 | 8 Jef D230 | 9 Jef D230 |
| Treatments | double | single | double | single | single |
| Compound 1 | 10.0 | 8.1 | 9.0 | 9.0 | 8.4 |
| Compound 2 | 9.8 | 9.3 | — | 9.7 | 8.6 |

Example C: comparatives. I: invention
As can be seen from the data shown in tables 3a and 3b. it is evident that the compositions according to the invention (Example I-1 and I-2) achieve excellent levels of adhesion especially with Compound 2 and with only a single dipping of the cords. These adhesion values obtained with the present compositions are at least comparable to the high standards represented by the RFL system currently in use (Example C-1), nevertheless presenting undoubted advantages in terms of stability and safety even with respect to alternative compositions (Example C-2 and C-3). Moreover, since the application process does not require any pre-activation, it is particularly rapid and economically competitive.

Table 4 below records the strength values (expressed in N/20 mm, with the respective standard deviation values in brackets) necessary for obtaining the 180° opening of a peeling specimen (strap peeling) obtained by means of the superimposition of two layers of co-vulcanized rubberized reinforcement, as described in standard ASTM D4393.

In particular, the individual rubberized layers were obtained by deposition on a rotating drum, preventively coated with a layer of the selected compound, of continuous cords with a constant pitch, respectively treated according to the prior art and according to the invention. The subsequent combination with regular pitch of multiple coils produced a desired rubberized cord fabric (Ar 1670/2 31.5×31.5) with density equal to 70 plies/dm and thickness of 0.90 mm.

Two layers of this fabric were superimposed along the main direction of the cords and co-vulcanized for 30 min at 170° C., taking care to introduce, for about the first 2 cm in the transverse direction to the cords, a sheet of inert film (for instance Mylar) which, once the vulcanized compound has been obtained, constitutes a guide zone for the subsequent opening of the specimen in dynamometer.

The vulcanized composite thus obtained was divided into 2-cm wide strips with an automatic cutter, in line with the main direction of the cords.

These strips were separated, starting from the guide zone, by traction using a Zwick Roell 2020 dynamometer at a speeds equal to 50 mm/min.

The maximum force (in N/20 mm) required to open the thus obtained sample at 180° C., was then recorded.

The visual appearance of the delamination surface between the two separated layers was evaluated following traction, with expression of the degree of coating of the cords by the compound on a scale of 1 to 5 as shown in Table 1. In particular, 5 represents a complete coating of the cords by the compound (100%), 1 represents the delamination at the cord/compound interface; the intermediate stages are shown in table 1. The cords are the same cords of the previous samples. The specific treatment conditions thereof and the compounds used are recorded in table 4.

Keys Table 4
Force: expresses the maximum value of force applied to tearing (N/20 mm) (standard deviation in brackets)
Mark: expresses the appearance of the sample following tearing (scale from 1 to 5 as shown in table 1)

In the peeling test, all samples evidenced cohesive failure within the rubber with variable residual amount of elastomeric material on the cords depending on the type of elastomeric material and composition adopted, indicative of a good adhesion.

According to this test, when coupled with the resorcinol-free compound (compound 2), the cords treated with the composition of the invention adhere—following a single treatment—even more of the current industry benchmark standard represented by the traditional RFL system (cords dipped in a first epoxy bath then in the second RFL bath and coupled with a traditional compound comprising resorcinol) (112 vs. 108).

On a visual judgment of the specimen following tearing, the two systems are comparable (score of 4), while if we compare the results of the specimens obtained with the resorcinol-free compound 2, the tear resistance according to the invention was even better (4 vs 3).

In conclusion, the composite of the present invention is an excellent substitute substantially free of the formaldehyde and resorcinol of the traditional system in current use, a system which on the other hand comprises resorcinol both at the level of the treated cords and at the level of compounds, with serious ecological and health implications.

The compositions of the compounds used in the tests are shown in table 5 below:

TABLE 5

| Compound | 1 | 2 |
|---|---|---|
| Natural rubber STR20 P93 (Thaiteck Rubber. Thailand) in mixture with polyisoprene SKI-3 (Nizhnekamsk. Russia) (90:10) | 100 | 90 |
| Styrene Butadiene Rubber SBR1500 (KER 1500-Dwory) | — | 10 |
| Carbon black N326 (Cabot Corp.) | 55 | 55 |
| N-(1.3-dimethylbutyl)-N'-phenyl-p-phenylenediamine (6PPD Santoflex Flexsys); | 2 | 2 |
| Vivatec 200 MES oil (H&R) | 2.5 | 2.5 |
| Stearic Acid Radiacid 444 (Oleon) | 1.5 | 1.5 |
| Zinc oxide green seal (Zincol Ossidi) | 5 | 5 |
| Tackifier SP 1068 (SI Group) | 2 | 2 |
| Phenolic resin Alnovol PN760 (CYTEC) | — | 3 |
| Resorcinol | 1.3 | |
| HMMM hexamethoxymethylmelamine (Cyrez 963. Cytec) | 1.9 | 1.9 |
| CBS N-cyclohexyl-2-benzothiazyl-sulphenamide (Vulkacit ® CZ. Lanxess) | 1.5 | 1.5 |
| Sulphur 67% CRYSTEX OT 33 AS (Flexsys) | 4.78 | 5.52 |

The kinetics and the mechanical properties of the compounds used in the tests are shown in table 6.

TABLE 4

| | Example (C/I) | | | | | | | | |
|---|---|---|---|---|---|---|---|---|---|
| | C-4 | C-4 | I-3 | I-3 | I-4 | I-4 | I-5 | I-5 | I-6 | I-6 |
| Composition | 1 + 2 | | 8 | | 11 | | 12 | | 13 | |
| | Epoxide. | | JD230 | | JSD231 | | JD400 | | JSD401 | |
| | RFL | | | | | | | | | |
| Treatments | double | | single | | single | | single | | single | |
| | Force | Mark | Force | Mark | Force | Mark | Force | Mark | Force | Mark |
| Compound 1 | 108 (5) | 4 | 76 (2) | 3 | 75 (8) | 3 | 70 (5) | 3 | 68 (7) | 3 |
| Compound 2 | 75 (9) | 3 | 112 (9) | 4 | — | | — | — | — | — |

TABLE 6

| Compound | 1 | 2 |
|---|---|---|
| Viscosity ML(1 + 4) (at 100° C.) | 58 | 60 |
| Rheometric analysis | | |
| ML[dN m] | 2.39 | 2.64 |
| MH[dN m] | 30.35 | 29.72 |
| TS2[min] | 1.07 | 1.16 |
| T90[min] | 2.87 | 4.31 |
| Tensile tests | | |
| Ca0.5 [MPa] | 1.9 | 2.5 |
| Ca1 [MPa] | 3.48 | 4.16 |
| Ca3 [MPa] | 15.51 | 15.8 |
| CR [MPa] | 20.58 | 19.86 |
| AR [%] | 407.86 | 395.0 |
| Tensile strength [J/cm$^3$] | 37.04 | 35.89 |
| Hardness [IRHD] at 23° C. | 87.0 | 86.4 |
| Elastic yield [%] at 23° C. | 55.0 | 54.0 |

Viscosity

Mooney viscosity is based on measurement of the torque required to maintain in rotation a rotor dipped in the mixture to be evaluated and was performed according to ASTM D1646.

The test parameters are the preheating time when the rotor is stationary and the rotation time before acquiring the necessary torque value for rotation. The standard test is performed at a temperature of 100° C. with 1 min of preheating and 4 min testing (identified with the initials ML (144). The speed of rotation is 0.209 rad/s (2 rev/min). The Mooney scale is directly proportional to the torque applied to the rotor with the following relation: 1 Mooney unit 0.083 N.m The average travelling speed gradient during the test is in the order of magnitude of 1 s$^{-1}$.

Rheometric Analysis

The rheometric analysis was performed according to ISO 6502 using a MDR—Moving Die Rheometer—under constant frequency isothermal conditions and deformation amplitude—(10 Hz; +/−3° of deformation) at 170° C. for 30 minutes,)

We measured the values of minimum torque (ML) expressed in Newtons*meters and maximum torque (MH), expressed in Newton*meter and an intermediate time of vulcanization which provide guidance on the kinetics of the reaction at the temperature of measurement.

Ts2 expresses the scorch time i.e. the time required in order to obtain a torque value equal to ML+0.22 (Newton. metro).

T90 expresses the vulcanization time in % i.e. the time required to obtain a torque value equal to ML+(90/100)* (MH−ML)

TS2=time at 170° C. required to achieve an increase of two rheometric units (ML+0.22 (Newton. metro)) measured with the MDR—Moving Die Rheometer;

T90=time at 170° C. required to achieve 90% of the final torque value measured by the MDR—Moving Die Rheometer;

Static Mechanical Test

The tensile test according to IS037-UN16065 generates a strain curve towards deformation. The instrument used was a dynamometer equipped with optical extensometer since the displacement of the moving crosshead is not directly proportional to the elongation of the sample in the gauge length. The test was performed on Dumbbell specimens vulcanized for 10 min at 170° C.

The static mechanical properties (CA05 load at 50% elongation. CA1 load at 100% elongation and CA3 load at 300% elongation), according to standard UNI 6065, were measured at different elongations (50%, 100%, 300%); the Load and Elongation at Break were also respectively measured CR and AR% on samples of the above-mentioned elastomeric materials, vulcanized at 170° C. for 10 minutes.

Characteristic points of the tensile test:
Ca 05=50% deformation strain (MPa)
Ca 1=100% deformation strain (MPa)
Ca 3=300% deformation strain (MPa)
CR=Strain at break (MPa)
AR=Deformation at break (%)
Strength=Tensile strength [J/cm$^3$]
Hardness The hardness test was performed by measuring the sinking of a penetrator in the material once a regulated load had been applied. The hardness in IRHD degrees (at 23° C.) was measured according to standard ISO 48:2007 on samples of the above-mentioned elastomeric materials vulcanized at 170° C. for 10 minutes.

The laboratory specimen was 8 mm thick. The method used was international Hardness (IRHD) with Reference standard: ISO48.

R.E.=Elastic yield % measured by the torsional pendulum (Zerbinii pendulum) in accordance with ISO 4662

The compound 2, characterized by the absence of resorcinol and formaldehyde. contributes to further improve the adhesion with the cords treated with the present compositions as evidenced by the data reported in tables 3a, 3b and 4.

In conclusion, the use of the compositions according to the invention in the manufacture of tyres, in particular in the treatment of fibrous materials of the reinforcing elements is particularly advantageous, given equal performance with the classic RFL system, because it is simpler, quicker and, on the whole, more economical. It also allows the reduction—by using specific compounds—and even completely avoidance of the use of resorcinol and free formaldehyde in the production of tyres, with undoubted advantages for the health of the operators and the environment.

High Speed Integrity Test

A high speed integrity test was conducted according to Regulation UNECE 30, Rev. 3-Amendment 2, Annex 7 "Procedure for load/speed performance tests".

The test was performed on UHP tyres 255/35 R20 97Y XL and with a chamber internal pressure of 3.6 bar at 0°, by rotating the tyre on a drum of 2 m of diameter under a load of 501 Kg.

The speed of the tyre was brought from 0 to 270 km/h in 10 min and then it was set as follows:
a) 20 min at constant speed of 270km/h
b) 10 min at constant speed of 280km/h
c) 10 min at constant speed of 290km/h
d) 10 min at constant speed of 300km/h The test was considered successful if the tyre survived all the steps without incurring in damages or showing defects, such as tearings or ruptures that may occur in different portions of the tyre.

The comparative sample tyre (tyre 1) incorporated a flipper reinforced with cords of Ar 1670/2 31,5×31,5 F80, cords which had been pre-treated with the conventional double dipping into RFL-based compositions 1 and 2 (see Table 2a and the following description of the pre-treatment) and had been coupled with compound 1 (traditional compound with resorcinol, Table 5) according to conventional manufacturing methods.

The sample tyre according to the invention (tyre 2) incorporated a flipper reinforced with cords of Ar 1670/2

31,5×31,5 F80, cords which had been pre-treated with a single dipping into composition 8 (Table 2b) and had been coupled with the compound 2 (resorcinol free compound, Table 5) according to conventional manufacturing methods.

Both the comparative sample tyre (tyre 1) and the sample tyre according to the invention (tyre 2) were able to pass the integrity test limit as described above, with no defects at the end of the test.

In conclusion, this rather demanding integrity test showed that the tyres of the invention—especially when they comprise, in the reinforced components, both the optimized compounds and the cords treated with the present compositions—had excellent integrity results comparable with those achieved with conventional tyres based on the RFL system. Advantageously, however the present tyres have a lower content or are substantially free of the cross-linking products of resorcinol.

The invention claimed is:

1. A tyre for vehicle wheels comprising:
   at least a reinforced structural element comprising
   at least an elongated reinforcing element and at least a cross-linked element adhered to said elongated reinforcing element, wherein said elongated reinforcing element comprises at least an elongated fibrous material comprising the cross-linking products of at least a cross-linkable adhesive composition comprising:
   at least a) a rubber latex,
   at least b) an epoxide, and
   at least c) a polyamine with molecular eight higher than 190 Daltons, comprising at least two amino groups selected from primary —NH$_2$ and secondary —NH— amino groups, wherein the polyamine c) is chosen from: c1) linear or branched amino terminated polyethers, c2) aminoalkylated polysaccharides, c3) aminoalkylated polyvinyl alcohols, and c4) mixtures thereof, and
   wherein the elongated fibrous material is chosen from rayon; lyocell; polyesters of PET, PEN, or PVA; aliphatic polyamides; aromatic polyamides; and mixtures thereof.

2. The tyre according to claim 1, further comprising:
   a carcass structure comprising at least one carcass layer having opposite side edges associated with respective bead structures comprising at least one annular anchoring element and at least one bead filler; and
   a tread band applied in a radially outer position to said carcass structure, wherein said at least one carcass layer comprises a cross-linked elastomeric material reinforced with a plurality of elongated reinforcing elements comprising the cross-linking products of at least a cross-linkable adhesive composition comprising at least a) a rubber latex, at least b) an epoxide, and at least c) a polyamine with molecular weight higher than 190 Daltons, comprising at least two amino groups selected from primary —NH$_2$ and secondary —NH— amino groups, wherein the polyamine c) is chosen from: c1) linear or branched amino terminated polyethers, c2)aminoalkylated polysaccharides, c3) aminoalkylated polyvinyl alcohols, and c4) mixtures thereof.

3. The tyre according to claim 2, further comprising a belt structure applied in a radially outer position to the carcass structure, said belt structure comprising at least a belt layer comprising said elongated reinforcing element comprising the cross-linking products of at least a cross-linkable adhesive composition comprising at least a) a rubber latex, at least b) an epoxide, and at least c) a polyamine with molecular weight higher than 190 Daltons, comprising at least two amino groups selected from primary —NH$_2$ and secondary —NH— amino groups, wherein the polyamine c) is chosen from: c1) linear or branched amino terminated polyethers, c2) aminoalkylated polysaccharides, c3) aminoalkylated alcohols, and c4) mixtures thereof.

4. The tyre according to claim 1, further comprising a reinforced structural element of bead structures, comprising at least a cross-linked elastomeric material and at least an elongated reinforcing element, wherein said elongated reinforcing element comprises the cross-linking products of at least a cross-linkable adhesive composition comprising at least a) a rubber latex, at least b) an epoxide, and at least c) a polyamine with molecular weight higher than 190 Daltons, comprising at least two amino groups selected from primary —NH$_2$ and secondary —NH— amino groups, wherein the polyamine c) is chosen from: c1) linear or branched amino terminated polyethers, c2) aminoalkylated polysaccharides, c3) aminoalkylated polyvinyl alcohols, and c4) mixtures thereof.

5. The tyre according to claim 1, further comprising a reinforced structural element as a bead structure protecting layer, said reinforced structural element comprising at least a cross-linked elastomeric material and at least an elongated reinforcing element, wherein said elongated reinforcing element comprises the cross-linking products of at least a cross-linkable adhesive composition comprising at least a) a rubber latex, at least b) an epoxide, and at least c) a polyamine with molecular weight higher than 190 Daltons, comprising at least two amino groups selected from primary —NH$_2$ and secondary —NH— amino groups, wherein the polyamine c) is chosen from: c1) linear or branched amino terminated polyethers, c2) aminoalkylated polyaccharides, c3) aminoalkylated polyvinyl alcohols, and c4) mixtures thereof.

6. The tyre according to claim 1, wherein said composition is an aqueous composition overall comprising from 2.5% to 20% by weight, of the components a) b) and c).

7. The tyre according to claim 1, wherein said composition is an aqueous composition overall comprising from 4% to 15% by weight, of the components a) b) and c).

8. The tyre according to claim 1, wherein said composition is an aqueous composition overall comprising from 5% to 10% by weight of the components a) b) and c).

9. The tyre according to claim 1, wherein said adhesive composition comprises from 2% to 17% of a) by weight, from 0.5 to 7% of b) by weight and from 0.05% to 3% of c) by weight.

10. The tyre according to claim 1, wherein said adhesive composition comprises from 3% to 12% of a) by weight, from 1% to 5% of b) by weight and from 0.1% to 2% of c) by weight.

11. The tyre according to of claim 1, wherein said adhesive composition comprises:
    a) a rubber latex comprising a butadiene - vinylpyridine - styrene copolymer, and/or
    b) a polyglycerol polyglycidyl ether.

12. The tyre according to claim 1, wherein said adhesive composition comprises a polyamine c) having molecular weight equal to or greater than 600 Daltons.

13. The tyre according to claim 1, wherein said adhesive composition and/or said elastomeric material are substantially free of resorcinol and/or free of formaldehyde and/or of cross-linking products thereof.

14. The tyre according to claim 1, wherein all reinforced and non-reinforced elastomeric components are substantially free of resorcinol and/or free of formaldehyde and/or of cross-linking products thereof.

15. A process for manufacturing a tyre for vehicle wheels, comprising:
  forming components of a green tyre onto at least a building drum; and
  shaping, moulding and vulcanizing the tyre,
  wherein forming at least one of the components of the green tyre comprises:
    making at least a reinforced structural element, said reinforced structural element comprising i) at least an elastomeric material comprising at least a diene elastomeric polymer and at least a reinforcing filler and ii) at least an elongated reinforcing element, Wherein said elongated reinforcing element comprises at least a fibrous material impregnated with at least a cross-linkable adhesive composition comprising:
  at least a) a rubber latex, at least b) an epoxide, and at least c) a polyamine with molecular weight higher than 190 Daltons, comprising at least two amino groups selected from primary —NH$_2$ and secondary —NH— amino groups, wherein the polyamine c) is chosen from: c1) linear or branched amino terminated polyethers, c2) aminoalkylated polysaccharides, c3) aminoalkylated polyvinyl alcohols, and c4) mixtures thereof, and
  wherein the fibrous material is chosen from rayon; lyocell; polyesters of PET, PEN, or PVA; aliphatic polyamides; aromatic polyamides; and mixtures thereof.

16. The process according to claim 15, wherein the adhesive compositions and/or elastomeric materials are free of resorcinol and/or free of formaldehyde.

17. A reinforced structural element of a tyre comprising at least an elongated reinforcing element and at least a cross-linked elastomeric material adhered to said elongated reinforcing element, wherein said elongated reinforcing element comprises at least an elongated fibrous material comprising cross-linking products of at least a cross-linkable adhesive composition comprising at least a) a rubber latex, at least b) an epoxide, and at least c) a polyamine with molecular weight higher than 190 Daltons, comprising at least two amino groups selected from primary —NH$_2$ and secondary —NH— amino groups, wherein the polyamine c) is chosen from: c1) linear or branched amino terminated polyethers, c2) aminoaikylated polysaccharides, c3) aminoalkvlated polyvinyl alcohols, and c4) mixtures thereof, and
  wherein the elongated fibrous material is chosen from rayon; lyocell; polyesters of PET, PEN, or PVA; aliphatic polyamides; aromatic polyamides; and mixture thereof.

18. The reinforced structural element according to claim 17, wherein said cross-linked elastomeric material is obtained by cross-linking a cross-linkable elastomeric material comprising at least a cross-linkable elastomeric polymer, at least a reinforcing filler, at least a methylene donor compound, at least a methylene acceptor compound and at least a vulcanizing agent, wherein said methylene acceptor compound is a phenolic resin.

19. The reinforced structural element according to claim 18, wherein said methylene acceptor compound is a novolac resin.

20. The reinforced structural element according to claim 17, wherein said cross-linkable elastomeric material comprises resorcinol in an amount lower than 0.5 phr to 0 phr.

21. The reinforced structural element according to claim 20, wherein said cross-linkable elastomeric material comprises resorcinol in an amount lower than 0.2 phr to 0 phr.

22. The reinforced structural element according to claim 20, wherein said cross-linkable elastomeric material comprises resorcinol in an amount lower than 0.1 phr to 0 phr.

23. The reinforced structural element according to claim 17, comprising a carcass structure, a belt structure, a flipper or a chafer.

24. The reinforced structural element according to claim 17, wherein adhesion between the cross-linked elastomeric material and the elongated reinforcing element, expressed as the maximum pulling force according to ASTM D4476, is at least 7 N/ mm$^2$.

25. The reinforced structural element according to claim 17, wherein adhesion between the cross-linked elastomeric material and the elongated reinforcing element, expressed as the maximum pulling force according to ASTM D4476, is at least 7.5 N/ mm$^2$.

26. The reinforced structural element according to claim 17, wherein adhesion between the cross-linked elastomeric material and the elongated reinforcing element, expressed as the maximum pulling force according to ASTM D4476, is at least 8 N/ mm$^2$.

27. The reinforced structural element according to claim 17, wherein a residual degree of coating of the cords, evaluated by visual inspection following a peel test carried out according to ASTM D4393, is at least 50%.

28. The reinforced structural element according to claim 17, wherein a residual degree of coating of the cords, evaluated by visual inspection following a peel test carried out according to ASTM D4393, is at least 75%.

29. The reinforced structural element according to claim 17, wherein a residual degree of coating of the cords, evaluated by visual inspection following a peel test carried out according to ASTM D4393, is at least 90%.

30. A cross-linkable elongated reinforcing element for a tyre comprising at least a fibrous material impregnated with at least a cross-linkable adhesive composition, said composition comprising at least a) a rubber latex, at least b) an epoxide, and at least c) a polyamine with molecular weight higher than 190 Daltons, comprising at least two amino groups selected from primary —NH$_2$and secondary —NH— amino groups, wherein the polyamine c) is chosen from: c1) linear or branched amino terminated polyethers, c2) aminoalkylated polysaccharides, c3) aminoalkylated polyvinyl alcohols, and c4) mixtures thereof, and
  wherein the fibrous material is chosen from rayon; lyocell; polyesters of PET, PEN, or PVA; aliphatic polyamides, aromatic polyamides; and mixtures thereof.

31. The elongated reinforcing element according to claim 30, wherein said cross-linkable adhesive composition is substantially resorcinol-and/or formaldehyde-free.

32. A process for manufacturing a cross-linkable elongated element for tyres which comprises:
  providing an elongated fibrous material for reinforced structural elements for tyres;
  impregnating the elongated fibrous material with at least a cross-linkable adhesive composition comprising at least a) a rubber latex, at least b) an epoxide, and at least c) a polyamine with molecular eight higher than 190 Daltons, comprising at least two amino groups selected from primary —NH$_2$ and secondary —NH— amino groups, wherein the polyamine c) is chosen from: c1) linear or branched amino terminated polyethers, c2) aminoalkylated polysaccharides, c3) aminoalkylated polyvinyl alcohols, and c4) mixtures thereof, and wherein the elongated fibrous material is chosen form rayon; lyocell; polyesters of PET, PEN or PVA; aliphatic polyamides; aromatic polyamides; and mixtures thereof; and drying the impregnated elongated fibrous material.

33. The process according to claim 32, wherein impregnating the elongated fibrous material is performed by dipping into the cross-linkable adhesive composition.

\* \* \* \* \*